(12) United States Patent
Takahata et al.

(10) Patent No.: US 9,035,873 B2
(45) Date of Patent: May 19, 2015

(54) HAPTIC FEEDBACK INPUT DEVICE

(71) Applicant: FUKOKU CO., LTD., Saitama (JP)

(72) Inventors: Daisuke Takahata, Saitama (JP); Yoshimasa Yamaguchi, Saitama (JP)

(73) Assignee: Fukoku Co., LTD., Saitama (JP)

( * ) Notice: Subject to any disclaimer, the term of this patent is extended or adjusted under 35 U.S.C. 154(b) by 165 days.

(21) Appl. No.: 13/780,684

(22) Filed: Feb. 28, 2013

(65) Prior Publication Data

US 2013/0229339 A1 Sep. 5, 2013

(30) Foreign Application Priority Data

Mar. 2, 2012 (JP) ................... 2012-046799

(51) Int. Cl.
*G06F 3/033* (2013.01)
*G06F 3/01* (2006.01)
*G06F 3/0362* (2013.01)

(52) U.S. Cl.
CPC .............. *G06F 3/016* (2013.01); *G06F 3/0362* (2013.01)

(58) Field of Classification Search
CPC ... G06F 3/013; G06F 3/0312; G06F 3/03544; G06F 3/0362; H01H 2003/008; H01H 2215/05–2215/052

USPC ................. 345/156–167; 200/251; 340/407.1
See application file for complete search history.

(56) References Cited

U.S. PATENT DOCUMENTS

| 2004/0032395 A1* | 2/2004 | Goldenberg et al. ......... 345/156 |
| 2006/0255683 A1* | 11/2006 | Suzuki et al. ................. 310/317 |
| 2010/0097198 A1 | 4/2010 | Suzuki |

FOREIGN PATENT DOCUMENTS

JP 2008-158909 A 7/2008

* cited by examiner

*Primary Examiner* — Liliana Cerullo
(74) *Attorney, Agent, or Firm* — Saliwanchik, Lloyd & Eisenschenk

(57) ABSTRACT

There is provided an input device, including: a base; an operation portion; and an oscillatory wave motor including a stator and a rotor, the rotor thrusting the stator, the oscillatory wave motor providing haptic feedback to an operator via the operation portion. Displacement of one of the stator and the rotor from the base in an axial direction is allowed, displacement of the one of the stator and the rotor in a rotational direction is restricted, and the operation portion includes the other one of the stator and the rotor.

16 Claims, 14 Drawing Sheets

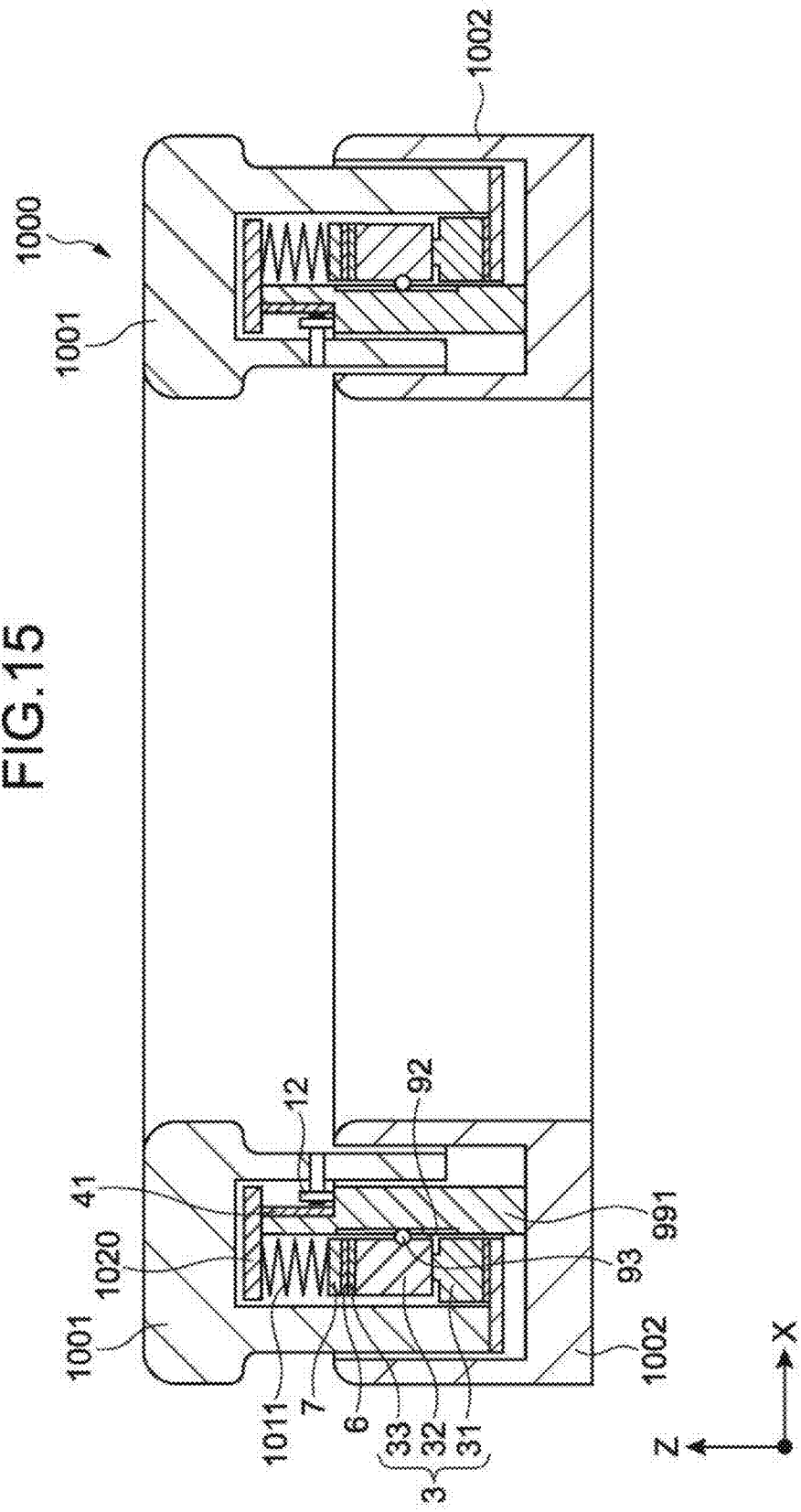

HAPTIC FEEDBACK INPUT DEVICE

CROSS-REFERENCE TO RELATED APPLICATION

This application claims the benefit under 35 U.S.C. §119 of Japanese Patent Application No. 2012-046799, filed Mar. 2, 2012, which is hereby incorporated by reference in its entirety.

BACKGROUND

The present disclosure relates to an input device capable of providing haptic feedback to an operator. More specifically, the present disclosure relates to an input device, which is called haptic device, and which is used for a personal computer, an automobile, a camera, a game machine, a medical device, or the like.

A haptic device haptically responds to a person in response to operation by the person. For example, when a person operates a haptic device, the device is capable of controlling behaviors on a display. Examples of such behaviors include selecting still image/moving image, transfer, stop, and the like. In response to an input operation, a haptic device transmits vibration or the like from the device to a person. The vibration or the like reminds a person that such operation is input.

Japanese Patent Application Laid-open No. 2008-158909 discloses an example of a haptic device. The haptic device disclosed in Japanese Patent Application Laid-open No. 2008-158909 has a ring shape as a whole. The haptic device includes a base at the lower portion, and a cap at the upper portion. The cap is capable of rotating with respect to the base. A user is capable of inputting operation by rotating the cap. The haptic device includes a sensor, a piezoelectric motor (ultrasonic motor), and the like. The sensor is configured to detect the above-mentioned rotation status. The piezoelectric motor (ultrasonic motor) is configured to provide haptic feedback in response to the rotation operation.

BRIEF SUMMARY

However, operation only in the rotational direction is input in the haptic device of Japanese Patent Application Laid-open No. 2008-158909. Further, it may sometimes be desirable to change force patterns of haptic feedback depending on input operation.

In view of the above-mentioned circumstances, an object of the present invention is to provide an input device capable of realizing various kinds of operation. Another object of the present invention is to provide an input device, which is preferable to change haptic feedback or force patterns of haptic feedback depending on input operation.

To attain the above-mentioned objects, an input device according to claim 1 of the present invention includes a base, an operation portion, and an oscillatory wave motor.

The oscillatory wave motor includes a stator and a rotor, the rotor thrusting the stator.

Displacement of one of the stator and the rotor from the base in an axial direction is allowed, and displacement of the one of the stator and the rotor in a rotational direction is restricted.

The operation portion includes the other one of the stator and the rotor.

The oscillatory wave motor provides haptic feedback to an operator via the operation portion.

The input device according to claim 2 further includes a first detection section configured to detect displacement of the operation portion from the base in the rotational direction.

The input device according to claim 3 further includes a second detection section configured to detect displacement of the operation portion from the base in the axial direction.

The input device according to claim 4 further includes: a first detection section configured to detect displacement of the operation portion from the base in the rotational direction; and a second detection section configured to detect displacement of the operation portion from the base in the axial direction.

The input device according to any one of claims 1 to 4 may further include a first elastic member configured to provide elastic force to the operation portion in a direction away from the base in the axial direction of the base.

The input device according to any one of claims 1 to 4 may further include a second elastic member configured to provide elastic force to the operation portion in a direction toward the base in the axial direction of the base.

According to the present invention, it is possible to input not only operation in the rotational direction but also operation in the axial direction. As a result, various kinds of operation are realized. Further, the present invention may be configured such that haptic feedback in the rotational direction changes depending on input operation in the axial direction. Further, the present invention may be configured as follows. That is, a plurality of force patterns of haptic feedback in the rotational direction may be prepared in a memory. A preset force pattern may be retrieved from the memory depending on input operation in the axial direction. An oscillatory wave motor may be controlled based on the retrieved force pattern. According to this configuration, it is possible to easily change force patterns in the rotational direction depending on input operation in the axial direction.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 15 is a sectional view showing an input device according to a tenth embodiment of the present invention.

DETAILED DESCRIPTION

Figure 1:
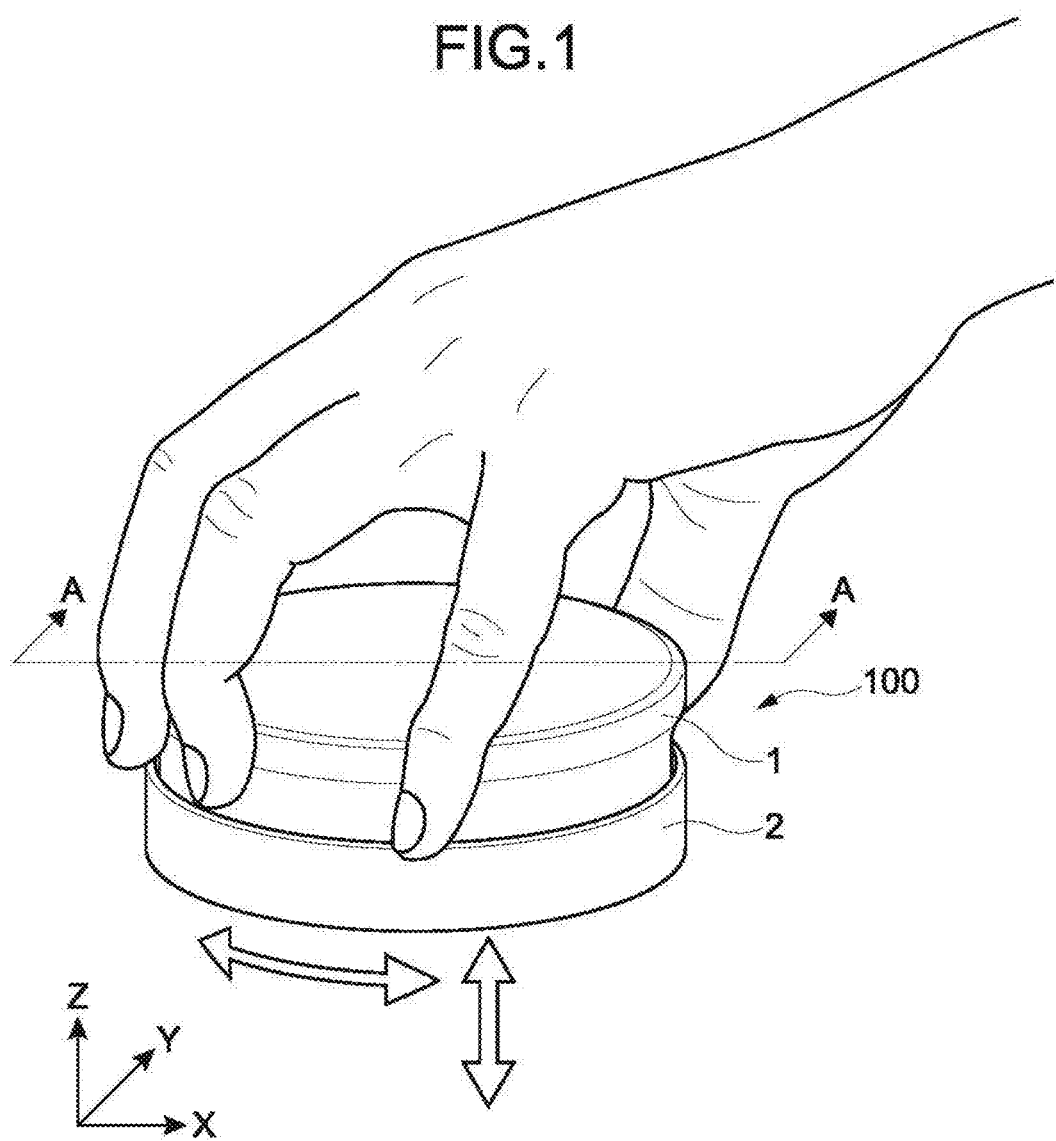
FIG. 1 is a perspective view showing an input device according to an embodiment of the present invention.

An input device according to an embodiment the present invention includes a base, an operation portion, and an oscillatory wave motor.

The oscillatory wave motor includes a ring-shaped stator and a ring-shaped rotor, the rotor thrusting the stator. Displacement of one of the stator and the rotor from the base in an axial direction is allowed, and displacement of the one of the stator and the rotor in a rotational direction is restricted. The operation portion includes the other one of the stator and the rotor. The other one of the stator and the rotor provides haptic feedback to an operator via the operation portion. "The operation portion includes" sometimes means that, for example, one of the stator and the rotor itself is the operation portion. Alternatively, "the operation portion includes" sometimes means that an integral member including one of the stator and the rotor and a handle such as a knob is the operation portion.

According to the input device, haptic feedback is provided to operation in the rotational direction input in the input device. In addition, it is possible to input operation in the axial direction. That is, the device disclosed in Japanese Patent Application Laid-open No. 2008-158909 has a structure in which a knob is not capable of being displaced in the axial direction. Because of this, it is not possible to input operation in the vertical direction (axial direction). To the contrary, according to an embodiment of the present invention, the input device allows displacement of the operation portion in the vertical direction (axial direction) by a predetermined amount of stroke. Because of this, it is possible to input operation in the vertical direction (axial direction). For example, an operational amount or operational speed in the vertical direction (axial direction) is detected as input. As a result, it is possible to realize various kinds of operation.

Further, by using the input device according to an embodiment of the present invention, it is possible to change force patterns of haptic feedback in the rotational direction depending on an operational amount (push-in amount) in the axial direction.

For example, the input device may be configured as follows. That is, the input device is structured such that two levels of push-in operation in the axial direction are realized. If the push-in position is at the initial position, a force pattern with no click feeling in the rotational direction is provided. If the push-in position is at the first level, a force pattern, with which click feelings are obtained at 90-degree intervals in the rotational direction, is provided. If the push-in position is at the second level, a force pattern, with which click feelings are obtained at 45-degree intervals in the rotational direction, is provided.

Note that the number of levels of push-in positions and force patterns may be arbitrarily set. Further, the input device may be configured as follows. That is, levels are not provided for push-in operation. An analog push-in amount is detected. Force patterns of haptic feedback are changed based on the detected push-in amount.

The input device may further include a first detection section configured to detect displacement of the operation portion from the base in the rotational direction.

The input device is capable of detecting displacement of the operation portion from the base in the rotational direction.

The input device may further include a second detection section configured to detect displacement of the operation portion from the base in the axial direction.

The input device is capable of detecting displacement of the operation portion from the base in the axial direction.

The input device may further include both: a first detection section configured to detect displacement of the operation portion from the base in the rotational direction; and a second detection section configured to detect displacement of the operation portion from the base in the axial direction.

The input device is capable of detecting displacement of the operation portion from the base in the rotational direction and in the axial direction. That is, the input device by itself includes a detection section configured to detect an operational amount in the rotational direction, and a detection section configured to detect an operational amount in the axial direction. Because of this, it is not necessary to additionally provide a detection section configured to detect an operational amount in the rotational direction, and a detection section configured to detect an operational amount in the axial direction. The input device is capable of detecting an operational amount in the rotational direction and an operational amount in the axial direction by itself.

The input device may further include a first elastic member configured to provide elastic force to the operation portion in a direction away from the base in the axial direction of the base.

The input device inputs operation in the push-in direction from the initial position. The first elastic member is provided to such an input device. Because of this, the operation portion is capable of returning to the initial position automatically. As a result, user-friendliness may be improved.

The input device may further include a second elastic member configured to provide elastic force to the operation portion in a direction toward the base in the axial direction of the base. The input device inputs operation in the pull-up direction from the initial position. The second elastic member is provided to such an input device. Because of this, the operation portion is capable of returning to the initial position automatically. As a result, user-friendliness may be improved.

Hereinafter, embodiments of the present invention will be described with reference to the drawings.

First Embodiment

Structure of Haptic Device

Figure 2:
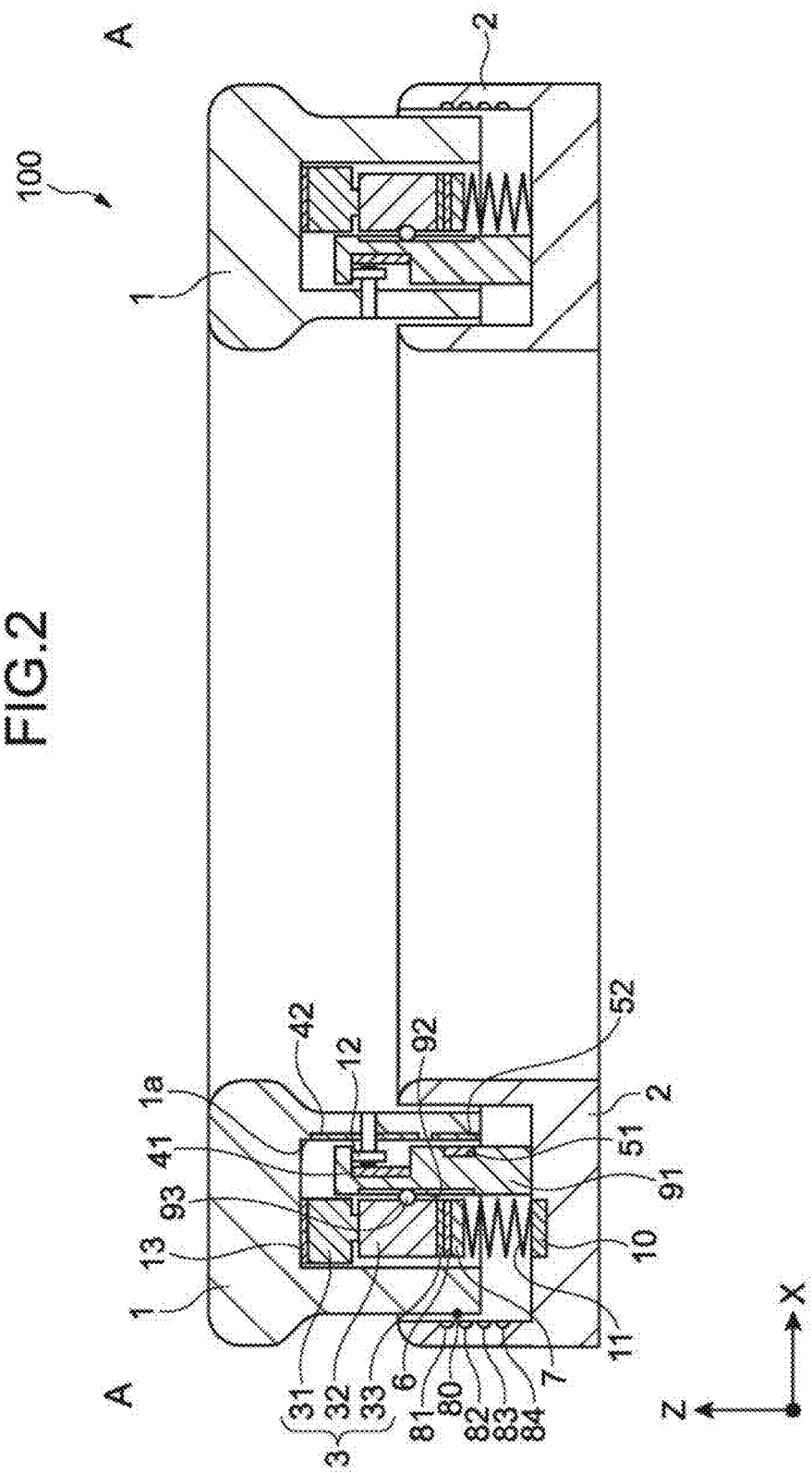
FIG. 2 is a sectional view of A-A line of FIG. 1.

FIG. 1 is a perspective view showing a haptic device 100 as an input device according to an embodiment of the present invention. FIG. 2 is a sectional view of A-A line of FIG. 1.

As shown in FIG. 1 and FIG. 2, the haptic device 100 has an approximate circular external form. The haptic device 100 includes a knob 1 as an operation portion, a base 2, and an ultrasonic motor 3.

The haptic device 100 includes rotation detection sensors 41 as a first detection section, and rotation detection slits 42.

The haptic device 100 includes a Z-axis direction position detection sensor 51 as a second detection section, and a magnetizing portion 52.

The haptic device 100 includes a cushion material 6, a seating 7, a Z-axis-direction position-keeping sphere 80, first to fourth position-keeping grooves 81 to 84, a first member 91, anti-rotation grooves 92, and anti-rotation spheres 93.

The haptic device 100 includes a pressure sensor 10, springs 11 as first elastic members, rollers 12, and a low-friction member 13.

The knob 1 is a handle, which is gripped by an operator when he operates the haptic device 100. The knob 1 is capable of being operated in the Z-axis direction (axial direction) and in the rotational direction where the Z axis is the rotational axis.

A rotor 31 of the ultrasonic motor 3 is fixed to the knob 1 via the low-friction member 13. The rotor 31 has a ring shape. The knob 1 faces the base 2. The knob 1 has a concave portion at the side that faces the base 2. The ultrasonic motor 3 and the like are arranged in the concave portion.

The rotation detection slits 42 and the magnetizing portion 52 are provided on the inner side surface 1a of the knob 1. Further, the position-keeping sphere 80 is arranged on the side surface of the outer circumferential portion of the knob 1.

The base 2 has a ring shape similar to the knob 1. The bottom portion of the base 2 is fixed on the control-target apparatus side. Alternatively, the base 2 may not be fixed on the control-target apparatus, and the haptic device 100 may be provided independently of the control-target apparatus. The base 2 has a concave portion. Specifically, the concave portion is provided on the entire area in the circumferential direction. In the concave portion, the knob 1 is capable of being displaced in the Z-axis direction of FIG. 2. Further, in the concave portion, the knob 1 is capable of being displaced in the rotational direction where the Z axis is the rotational axis.

The pressure sensor 10 is arranged on the inner bottom surface of the concave portion of the base 2. The first to fourth position-keeping grooves 81 to 84 are provided on the inner side surface of the concave portion of the base 2.

The ultrasonic motor 3 includes the rotor 31, a stator 32, and piezoelectric devices 33. The rotor 31 has a ring shape. The stator 32 has a ring shape. The piezoelectric devices 33 are arranged in a ring shape on the stator 32 side.

The rotor 31 thrusts the stator 32, and faces the stator 32.

The stator 32 is capable of being displaced from the base 2 in the Z-axis direction. The stator 32 is not capable of being displaced from the base 2 in the rotational direction.

In FIG. 2, the rotor 31 is arranged on the stator 32. The springs 11 are fixed on the base 2. The springs 11 bias the stator 32 to the rotor 31 side. The rotor 31 thrusts the stator 32. A number of polarized piezoelectric devices 33 are attached on the lower surface of the stator 32. The piezoelectric devices 33 are divided into two groups where ¼ wavelength interval of drive high-frequency waves is changed.

Then, high-frequency voltage having phase difference of 90° is applied to the piezoelectric devices in each group. As a result, a travelling wave is generated in the stator 32. The travelling wave, which is generated in the stator 32, generates torque in the rotor 31, which thrusts the stator 32. The direction, strength, and the like of the generated torque are controlled. As a result, for example, it is possible to change force patterns of haptic feedback depending on push-in position of the knob 1 when an operator rotates and operates the knob 1.

In this embodiment, the ultrasonic motor 3 is used for the haptic device 100. Because of this, it is possible to easily control haptic feedback such that a person is capable of sensuously understanding difference of haptic feedback.

In this embodiment, the rotor 31 is covered with the knob 1. The rotor 31 and the knob 1 function as an operation portion. In the operation portion, the rotor 31 and the knob 1 are displaced when an operator operates the knob 1 in the Z-axis direction and in the rotational direction. Alternatively, the knob 1 may not be provided, the rotor 31 may be exposed, and an operator may directly operate the rotor 31.

The first member 91 is fixed on the bottom surface of the concave portion of the base 2. The first member 91 protrudes from the bottom surface. The first member 91 is formed on the concave portion of the base 2. Specifically, the first member 91 is formed on the entire area in the circumferential direction, and has a ring shape. The first member 91 and the base 2 may be a single member. Alternatively, the independent first member 91 may be attached on the base 2.

The first member 91 is in the concave portion of the knob 1. The first member 91 is in the collar of the ring-shaped ultrasonic motor 3. The rotation detection sensors 41 and the Z-axis direction position detection sensors 51 are attached on the inner side surface of the ring-shaped first member 91.

The anti-rotation grooves 92 are provided on the outer side surface of the first member 91. A concave portion is provided on the inner side surface of the ring-shaped first member 91. Specifically, the concave portion is provided on the entire area in the circumferential direction. The rollers 12 are arranged in the concave portion. Because of this, the displacement range of the knob 1 in the Z-axis direction is limited.

The rotation detection sensor 41 is configured to detect an operational amount (for example, rotation angle) of the knob 1 in the rotational direction. The rotation detection sensor 41 is a proximity sensor, for example.

Figure 3:
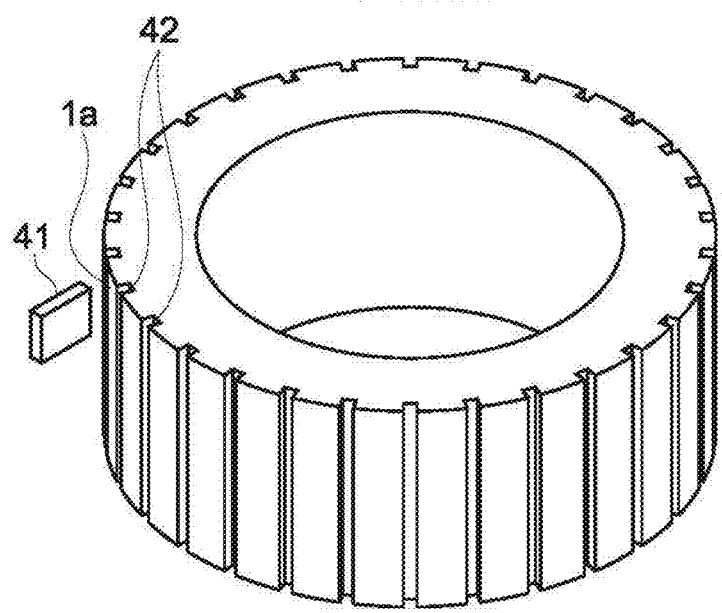
FIG. 3 is a schematic partial perspective view of FIG. 1, and shows arrangement of rotation detection sensors.

FIG. 3 is a schematic diagram showing positional relation between the rotation detection sensor 41 and the rotation detection slits 42.

As shown in FIG. 2 and FIG. 3, the plurality of rotation detection slits 42 are provided on the inner side surface 1a of the knob 1. Specifically, the plurality of rotation detection slits 42 are provided on the entire area in the circumferential direction of the knob 1. The rotation detection slit 42 has the longitudinal direction in the Z-axis direction. The rotation detection sensors 41 are fixed on the surface of the first member 91, which faces the inner side surface 1a of the knob 1. The rotation detection sensors 41 detect the rotation detection slits 42 to thereby detect an operational amount (rotation angle) of the knob 1.

At least one rotation detection sensor 41 may be provided. Alternatively, for example, four rotation detection sensors 41 may be provided at equal intervals in the circumferential direction, for example. With this structure, the four rotation detection sensors 41 are capable of recognizing detection errors due to noise and the like.

Figure 4:
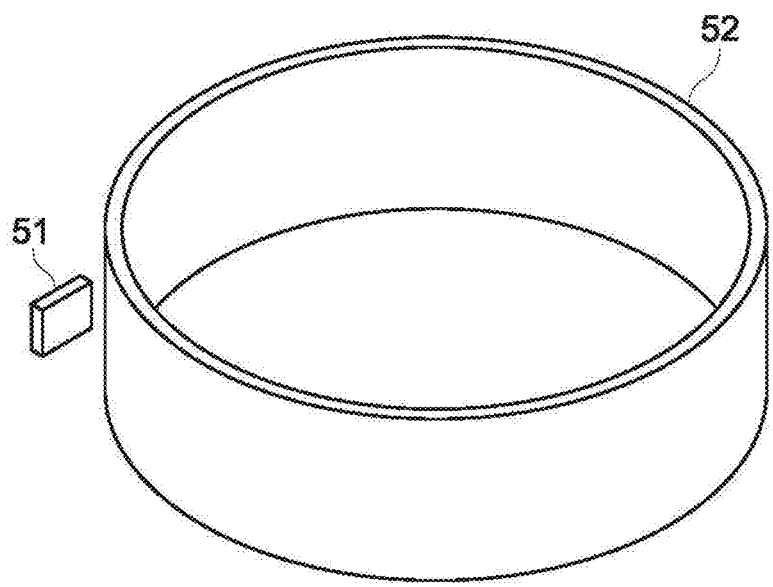
FIG. 4 is a schematic partial perspective view of FIG. 1, and shows arrangement of Z-axis direction position detection sensors.

As shown in FIG. 2, the Z-axis direction position detection sensor 51 is configured to detect an operational amount (displacement amount) of the knob 1 in the Z-axis direction, i.e., push-in amount of the knob 1. For example, an MR sensor (Magnetic Resistant Sensor) may be used as the Z-axis direction position detection sensor 51. A location sensor, a pressure sensor, or the like may be used as the Z-axis direction position detection sensor 51 other than the MR sensor. FIG. 4 is a schematic diagram showing positional relation between the Z-axis direction position detection sensor 51 and the magnetizing portion 52.

As shown in FIG. 2 and FIG. 4, the circular magnetizing portion 52 is formed on the inner side surface 1a of the knob 1. Specifically, the circular magnetizing portion 52 is formed on the area in the circumferential direction of the knob 1. The Z-axis direction position detection sensor 51 is fixed on the surface of the first member 91, which faces the inner side surface 1a of the knob 1. Resistance values of the Z-axis direction position detection sensor 51 is changed, whereby the Z-axis direction position detection sensor 51 detects an operational amount (displacement amount) of the knob 1 in the Z-axis direction.

At least one Z-axis direction position detection sensor 51 may be provided. Alternatively, for example, four Z-axis direction position detection sensors 51 may be provided at equal intervals in the circumferential direction, for example. With this structure, for example, in a case where the knob 1 is obliquely pushed in, the average of the four sensors or the like is calculated, whereby the push-in amount may be corrected.

As shown in FIG. 2, the cushion material 6 has a ring shape. The cushion material 6 is provided between the ultrasonic motor 3 and the seating 7. The cushion material 6 is made of paper, fabric such as felt, or the like.

The cushion material 6 hardly transmits vibration, which is generated by the ultrasonic motor 3, in the downward direction of FIG. 2 (direction toward base 2). The cushion material 6 does not disperse vibration. The cushion material 6 is capable of providing haptic feedback by the ultrasonic motor 3 to an operator via the knob 1 efficiently.

The seating 7 has a ring shape. The seating 7 supports the springs 11.

Figure 5:
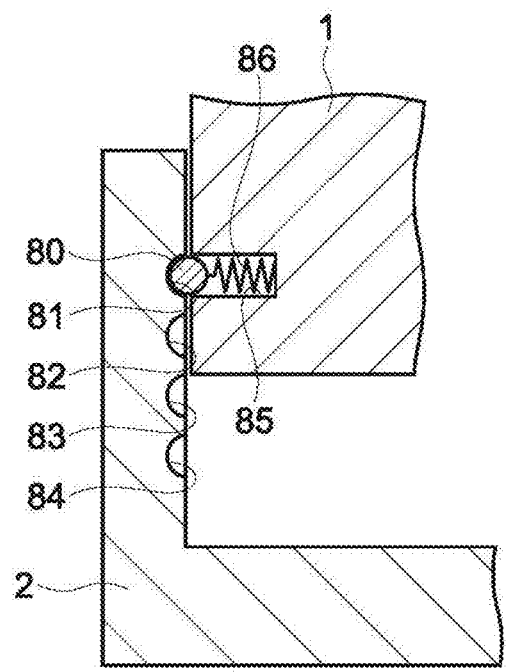
FIG. 5 is an enlarged view of FIG. 1, which shows a Z-axis direction position-keeping mechanism.

FIG. 5 is an enlarged view showing a part of the haptic device 100 for explaining a position-keeping mechanism.

As shown in FIG. 2 and FIG. 5, the position-keeping sphere 80 is in a hole 85, which is provided on the outer side surface of the knob 1. The knob 1 holds the position-keeping sphere 80 via a spring 86. The spring 86 expands/contracts, whereby the sphere 80 is capable of moving in the hole 85.

The first to fourth position-keeping grooves 81 to 84 are provided on the inner side surface of the base 2. Specifically, the first to fourth position-keeping grooves 81 to 84 are provided on the entire area in the circumferential direction. An operator pushes/pulls the knob whereby the knob 1 is displaced in the Z-axis direction. At this time, the inner side surface of the base 2 pushes the sphere 80 until the sphere 80 engages with one of the grooves 81 to 84. At this time, the sphere 80 moves while the spring 86 contracts and the sphere 80 is accommodated in the hole 85. Then, the sphere 80 moves to the position of one of the grooves 81 to 84. At this time, the contracted spring expands, and the sphere 80 engages with one of the grooves 81 to 84. Because the sphere 80 engages with one of the grooves 81 to 84, the knob 1 is not capable of being displaced in the Z-axis direction, and the position of the knob 1 in the Z-axis direction is held.

As described above, the knob 1 is held. Alternatively, the knob 1 may provide a click feeling (operational feeling) to an operator, who operates the knob 1, every time the sphere 80 passes one of the grooves 81 to 84.

A state where the sphere 80 engages with the groove 81 is referred to as a first mode. A state where the sphere 80 engages with the groove 82 is referred to as a second mode. A state where the sphere 80 engages with the groove 83 is referred to as a third mode. A state where the sphere 80 engages with the groove 84 is referred to as a fourth mode.

As described above, the position-keeping mechanism including the sphere 80 and the position-keeping grooves 81 to 84 is provided. Because of this, when an operator operates the knob 1 in the Z-axis direction, the operator gets a feel of the sphere 80, which engages with one of the grooves 81 to 84, via the knob 1. The user is capable of knowing that a mode is switched by the feel. Because of this, it is possible to reliably input an operation in the knob 1 in the Z-axis direction. Note that the mode switch status may be displayed on an additionally-provided display. Alternatively, an LED or the like may be provided, and may be turned on/off depending on mode switching.

In this embodiment, when an operator rotates the knob 1, haptic feedback is provided to the operation portion. The haptic feedback is different depending on each mode.

For example, the following force pattern of haptic feedback is selected for rotation operation under the first mode setting. That is, rotation operation of the knob 1 does not generate a click feeling, and the knob 1 is rotated smoothly.

The following force pattern of haptic feedback is selected tier rotation operation under the second mode setting. That is, a click feeling is generated every time the knob 1 rotates by 45 degrees with respect to the initial position.

The following force pattern of haptic feedback is selected for rotation operation under the third mode setting. That is, a click feeling is generated every time the knob 1 rotates by 90 degrees with respect to the initial position.

The following force pattern of haptic feedback is selected for rotation operation under the fourth mode setting. That is, a click, feeling is generated every time the knob 1 rotates by 120 degrees with respect to the initial position.

The force patterns corresponding to the respective modes are stored in a memory. The force pattern corresponding to the set mode is retrieved from the memory. The ultrasonic motor 3 is controlled based on the force pattern. As a result, it is possible to realize the force patterns, which are different depending on the modes.

Note that the number of modes and force patterns may be set arbitrarily. Further, in a case where a click, feeling is generated during operation in the rotational direction, strength of click feelings may be changed depending on the modes. Such setting may be arbitrarily employed depending on a control-target apparatus. Further, the input device may be configured as follows. That is, a pointer on a display of a game apparatus or the like is moved depending on operation of the knob 1 in the rotational direction. In this case, when the pointer enters a predetermined area on the display, force patterns of haptic feedback are changed.

The sphere 80 may be made from a conductive material. Conduction circuits (not shown) may be provided corresponding to the grooves 81 to 84, respectively, such that electrical conduction is established when the sphere 80 engages with one of the position-keeping grooves 81 to 84. The amount of detected voltage may be different depending on the grooves when electrical conduction is established.

As a result, it is possible to detect displacement of the knob 1 in the Z-axis direction based on the amount of the detected voltage. That is, it is possible to detect the selected mode.

The sphere 80 and the grooves 81 to 84 may only configure a switch circuit, whereby it is possible to detect the modes in the same manner.

As described above, the structure including the position-keeping mechanism and the conduction circuit may be employed as the second detection section, which detects displacement of the knob 1 and the rotor 31 in the axial direction.

As shown in FIG. 2, the anti-rotation spheres 93 are fixed on the inner side surface of the stator 32. The anti-rotation groove 92 has the longitudinal direction in the Z-axis direction. The anti-rotation grooves 92 are provided on the outer side surface of the first member 91. When the knob 1 is displaced in the Z-axis direction and the stator 32 thus moves, the sphere 93 moves in the groove 92 in the longitudinal direction of the groove 92. The groove width of the groove 92 restricts movement of the sphere 93 in the rotational direction. As a result, the spheres 93 and the grooves 92 restrict displacement of the stator 32 in the rotational direction. The stator 32 is not capable of being displaced from the base 2 in the rotational direction.

In this manner, the groove 92 and the sphere 93 constitutes an anti-rotation mechanism. A plurality of anti-rotation mechanisms are provided in the circumferential direction at approximately equal intervals.

The pressure sensor 10 is configured to detect pressing force when an operator pushes the knob 1 in the direction toward the base 2 and the knob 1 is thus displaced in the Z-axis direction. The pressure sensor 10 may function as the second detection section, and may be used to detect the position of the knob 1 in the Z-axis direction. Further, the pressure sensor 10 may function as the detection section, and may detect if the knob 1 is pushed in the Z-axis direction or not.

One end of the spring 11 is fixed on the bottom portion of the base 2. The other end of the spring 11 is fixed on the seating 7. The springs 11 are capable of expanding/contracting in the Z-axis direction. The plurality of springs 11 are provided on the ring-shaped concave portion of the base 2. Specifically, the plurality of springs 11 are provided on the entire area in the circumferential direction.

The springs 11 allow the stator 32 to thrust the rotor 31. Further, the springs 11 hold the stator 32 in the Z-axis direction in the state where the stator 32 thrusts the rotor 31. When the knob 1 is pushed, the springs 11 provides elastic force to the rotor 31, which is at the operation portion, via the stator 32 in the direction (upward direction of FIG. 2) away from the base 2 in the Z-axis direction of the base 2. The springs 11 are capable of causing the stator 32 to always thrust the rotor 31 irrespective of the position of the knob 1 in the Z-axis direction. Further, elastic force of the springs 11 is adjusted, whereby it is possible to pull the knob 1 (operation in upward direction of FIG. 2) with small force.

Further, the springs 11 elastically hold the rotor 31. Because of this, even if excessive pressing force is applied to the knob 1, it is possible to make pressing force, which is applied to the friction surface between the rotor 31 and the stator 32, smaller.

As a matter of course, another elastic member such as a plate spring may be used in place of the spring 11.

The rollers 12 are fixed on the inner side surface of the knob 1 via shafts 12a, respectively. The rollers 12 are arranged in the concave portion, which is provided on the inner circumferential side surface of the first member 91. The rollers 12 are capable of moving in the circumferential direction. The plurality of (for example, four) rollers 12 are provided in the circumferential direction at equal intervals.

The top surface and the bottom surface of the concave portion, which is provided on the side surface of the first member 91, restrict movement of the rollers 12 in the Z-axis direction. The rollers 12 restrict a push-in amount and a pull-back amount of the knob 1. Further, because of the rollers 12, it is possible to smoothly operate the knob 1 in the rotational direction at the displacement limit in the Z-axis direction. Further, because the push-in amount of the knob 1 is restricted, pressure is not excessively applied to the ultrasonic motor 3 in the Z-axis direction.

The low-friction member 13 is arranged between the knob 1 and the rotor 31. The knob 1 is indirectly integrated with the rotor 31 via the low-friction member 13. It is preferable that the friction coefficient of the low-friction member 13 be equal to or less than the friction coefficient of the friction portion between the rotor 31 and the stator 32 when current is not applied to the ultrasonic motor 3. Because of this, in a case where excessive rotative force is input in the knob 1, the low-friction member 13 allows the knob 1 to run idle with respect to the rotor 31. As a result, it is possible to guard the friction surface between the rotor 31 and the stator 32.

As described above, according to this embodiment, the single device is capable of selecting a plurality of modes, and executing various adjustments under each mode. The device is controlled as follows. The mode is switched based on input operation in the axial direction. An operator rotates the operation portion under each mode. Different haptic feedback in the rotational direction is provided to an operator for each mode.

Here, pressure is applied in the axial direction to the device disclosed in Japanese Patent Application Laid-open No. 2008-158909. However, such pressure operation is operation for selecting a piece of music, for example. Such pressure operation is merely click operation. To the contrary, according to this embodiment, the knob of the haptic device is positively displaced in the axial direction, to thereby switch a plurality of modes. It is possible to detect, as input information, detailed information depending on operation in the vertical direction (axial direction). It is possible to realize various kinds of operation.

The haptic device of this embodiment has a function of providing different haptic feedback to an operator depending on the mode select by the operator, when the operator rotates the operation portion.

Configuration of System

Figure 6:
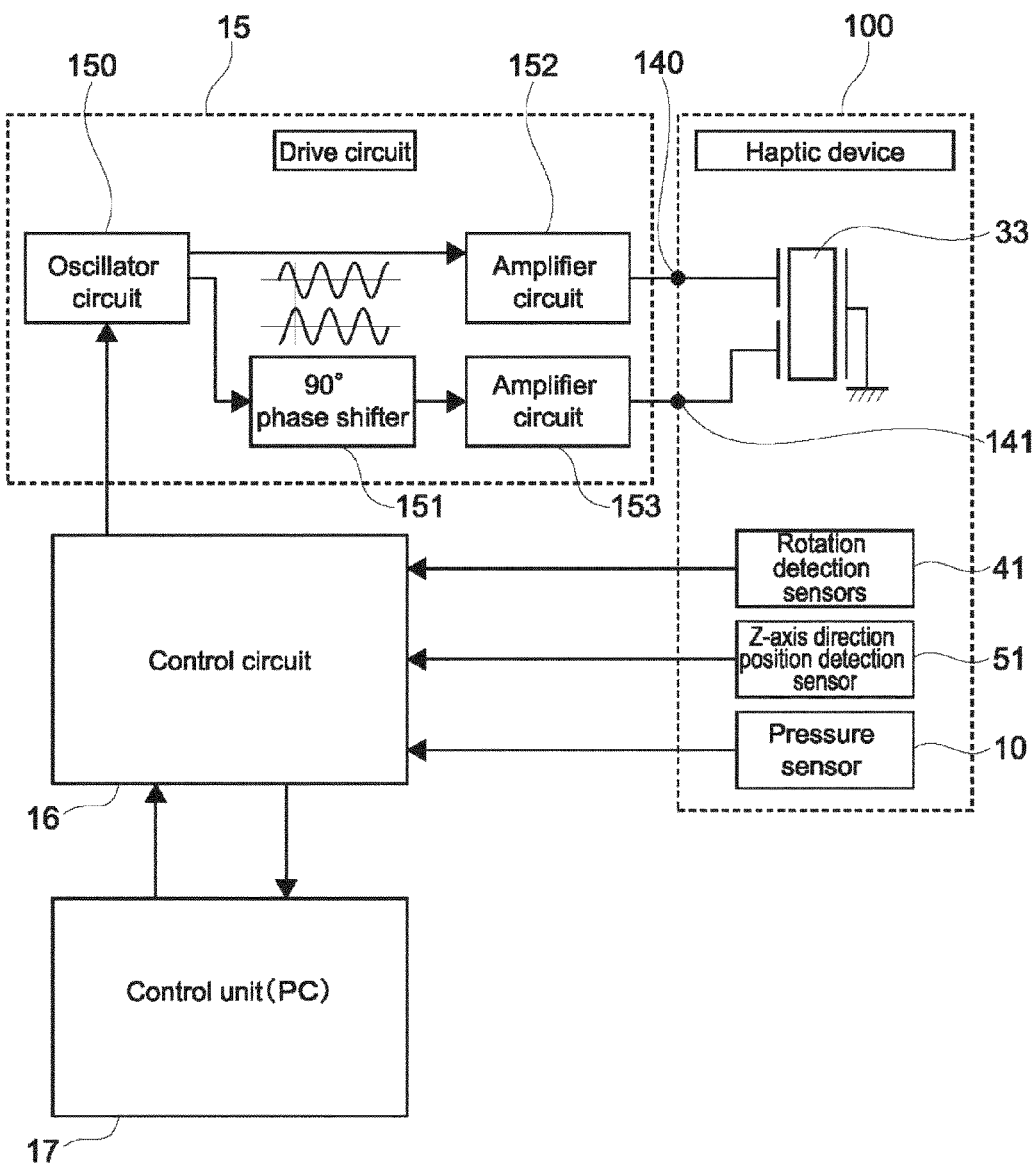
FIG. 6 is a configuration diagram showing a system including the input device of FIG. 1.

Next, with reference to FIG. 6, a system for controlling the haptic device 100 will be described.

The system of this embodiment includes the haptic device 100, a drive circuit 15, a control circuit 16, and a control unit 17.

The haptic device 100 includes input terminals 140, 141. The drive circuit 15 generates drive voltages, and inputs the drive voltages in the input terminals 140, 141, respectively. Specifically, the drive circuit 15 generates drive voltages having phase difference of 90°. The input terminals 140, 141 apply the drive voltages having phase difference of 90° to the piezoelectric devices 33, respectively. Because the drive voltages are applied to the piezoelectric devices 33, the stator 32 generates a travelling wave. Because the stator 32 generates a travelling wave, the rotor 31, which thrusts the stator 32, is capable of generating torque.

The drive circuit 15 includes an oscillator circuit 150, a 90° phase shifter 151, and amplifier circuits 152, 153. The drive circuit 15 generates drive voltages to be applied to the haptic device 100 based on a drive signal input from the control circuit 16.

The oscillator circuit 150 generates high-frequency voltage. The oscillator circuit 150 inputs the generated high-frequency voltage in the amplifier circuit 152, and in the amplifier circuit 153 via the 90° phase shifter 151. The amplifier circuits 152, 153 amplify the high-frequency voltage input in the amplifier circuits 152, 153, respectively. The amplifier circuits 152, 153 apply the amplified high-frequency voltages to the piezoelectric devices 33 of the haptic device 100. The high-frequency voltage amplified by the amplifier circuit 152 and the high-frequency voltage amplified by the amplifier circuit 153 have phase difference of 90°.

The control unit 17 is connected to the control circuit 16. The control unit 17 includes a memory. The memory stores different force patterns for different modes, respectively. The control unit 17 retrieves a force pattern in response to output from the Z-axis direction position detection sensor 51. The retrieved force pattern corresponds to a mode, which is set based on operation of the knob 1 in the Z-axis direction. The control unit 17 outputs the retrieved force pattern to the control circuit 16.

The control circuit 16 outputs a drive signal to the oscillator circuit 150. The drive signal is output to generate haptic feedback corresponding to the retrieved force pattern.

Note that the rotation detection sensors 41 detect an operational amount of the knob 1 in the rotational direction. The output signals from the rotation detection sensors 41 are input in the control unit 17 via the control circuit 16.

Then, the control unit 17 outputs an instruction signal to a control-target apparatus (not shown). The instruction signal corresponds to the operational amount of the knob 1 in the rotational direction.

Note that an operator may not operate the knob 1 in the Z-axis direction in order to set a mode. Alternatively, an operator may operate the knob 1 in the Z-axis direction to thereby control a control-target apparatus.

According to this embodiment, the haptic device 100 includes the rotation detection sensors 41, the Z-axis direction position detection sensor 51, and the pressure sensor 10. Alternatively, the haptic device 100 may not include the sensors. For example, the following configuration may be employed. An optical sensor detects that an operator operates the knob 1 in the rotational direction or in the Z-axis direction. The optical sensor inputs a signal in the control circuit 16. The control circuit 16 provides haptic feedback to the knob 1. The present invention is not limited to the above-mentioned embodiment, and is applicable to various modes.

Further, haptic feedback provided to the knob 1 is not limited to a click feeling. For example, haptic feedback may be changed for predetermined rotation angles. Further, minute vibration may be provided to the knob 1 in the rotational direction. Haptic feedback may be arbitrarily set depending on a control-target apparatus or an operation mode. Further, the haptic device 100 may be configured as follows. Speed and acceleration in the rotational direction may be detected when the knob 1 is operated in the rotational direction. Further, speed and acceleration in the Z-axis direction may be detected when the knob 1 is operated in the Z-axis direction. A control-target apparatus may be controlled based on the detected speed and acceleration. At the same time, haptic feedback provided to the knob 1 may be changed. A force pattern of haptic feedback may be changed.

Second Embodiment

Figure 7:
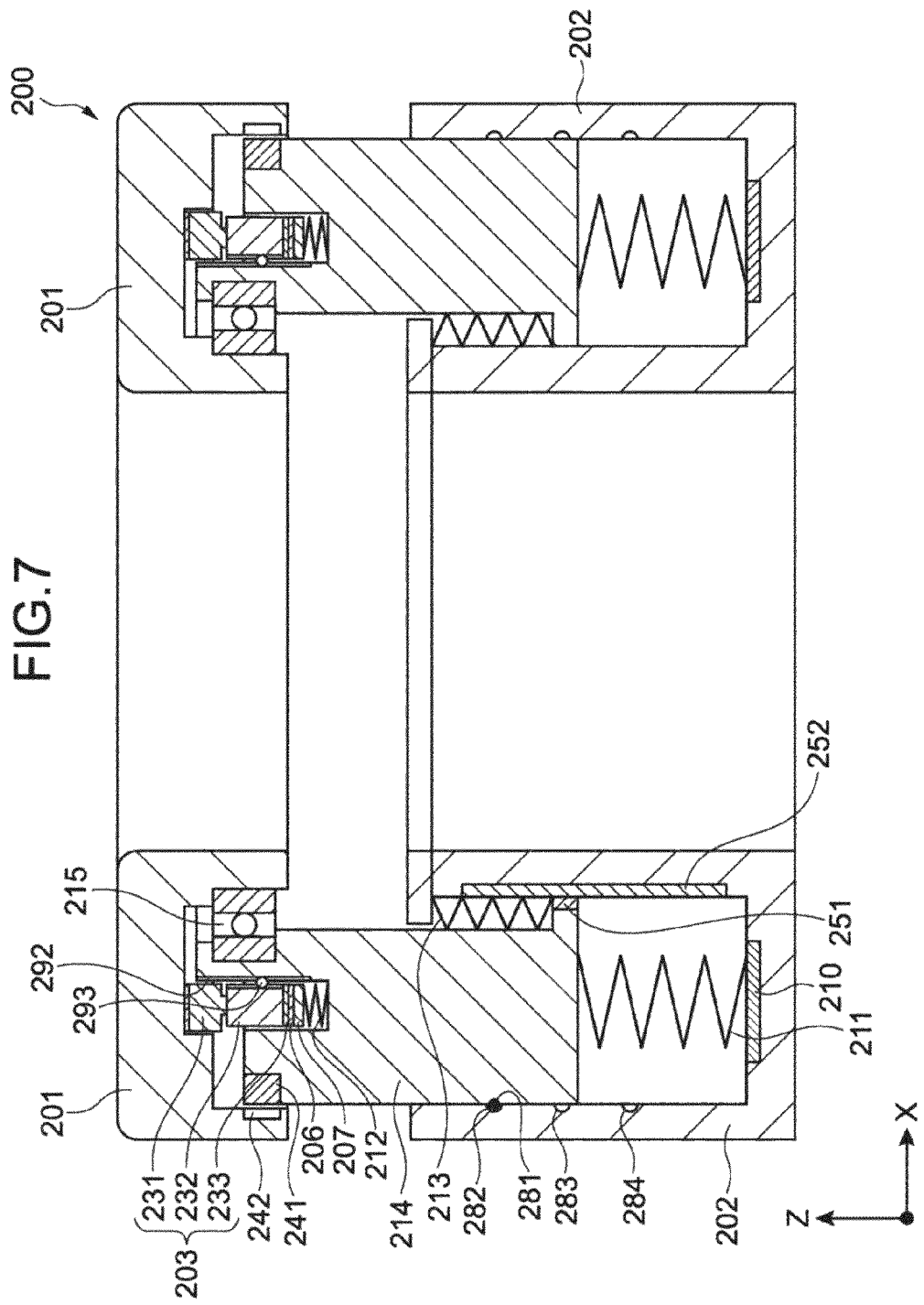
FIG. 7 is a sectional view showing an input device according to a second embodiment of the present invention.

With reference to FIG. 7, a haptic device according to a second embodiment will be described.

FIG. 7 is a sectional view showing the haptic device. The structure of the second embodiment is mainly different from the structure of the first embodiment as follows. An intermediate member is provided between the ultrasonic motor and the springs fixed on the base. The rotation detection sensors are arranged at different positions. The Z-axis direction position detection sensors are arranged at different positions.

As shown in FIG. 7, a haptic device 200 includes a knob 201 as the operation portion, a base 202, an ultrasonic motor 203, and an intermediate member 214.

The haptic device 200 includes rotation detection sensors 241 as the first detection section, and rotation detection slits 242.

The haptic device 200 includes a Z-axis direction position detection sensor 251 as the second detection section, and a magnetizing portion 252.

The haptic device 200 includes a cushion material 206, a seating 207, a position-keeping sphere 281, a first position-keeping groove 282, a second position-keeping groove 283, a third position-keeping groove 284, anti-rotation grooves 292, and anti-rotation spheres 293.

The haptic device 200 includes a pressure sensor 210, springs 211 as the first elastic members, springs 212, springs 213, and a bearing 215.

The knob 201 is a handle, which is gripped by an operator when he operates the haptic device 200. Similar to the first embodiment, the knob 201 is fixed on a rotor 231 of the ultrasonic motor 203 (described later) via a low-friction member.

The knob 201 is capable of being displaced from the base 202 in the Z-axis direction and in the rotational direction where the Z axis is the rotational axis.

The knob 201 faces the base 202. The knob 201 has a concave portion at the side that faces the base 202.

The rotation detection slits 242 are provided on the inner side surface of the concave portion of the knob 201.

The base 202 has a ring shape. The bottom portion of the base 202 is fixed on the control-target apparatus side. The base 202 has a concave portion. Specifically, the concave portion is provided on the entire area in the circumferential direction. In the concave portion, the intermediate member 214 is capable of moving in the Z-axis direction. The intermediate member 214 moves together with the knob 201 and the ultrasonic motor 203 with respect to the displacement of the knob 1 in the Z-axis direction. The pressure sensor 210 is arranged on the inner bottom surface of the base 202. The first position-keeping groove 282, the second position-keeping groove 283, the third position-keeping groove 284, and the magnetizing portion 252 are provided on the inner side surface.

Similar to the ultrasonic motor 3 of the first embodiment, the ultrasonic motor 203 includes the rotor 231, a stator 232, and piezoelectric devices 233. The rotor 231 has a ring shape. The stator 232 has a ring shape. The piezoelectric devices 233 are arranged in a ring shape.

The rotor 231 thrusts the stator 232. The rotor 231 faces the stator 232.

The stator 232 is capable of being displaced from the base 202 in the Z-axis direction. The stator 232 is not capable of being displaced from the base 202 in the rotational direction. The rotor 231 as the operation portion is fixed on the knob 201. The rotor 231 moves as the knob 201 is displaced in the Z-axis direction and in the rotational direction.

The cushion material 206 has a ring shape. The cushion material 206 is provided between the ultrasonic motor 203 and the seating 207. The cushion material 206 is made of paper, fabric such as felt, or the like. The function of the cushion material 206 is similar to the above-mentioned function of the cushion material 6.

The seating 207 has a ring shape. The seating 207 supports the springs 212.

The intermediate member 214 has a ring shape. The intermediate member 214 is arranged between the base 202 and the ultrasonic motor 203.

The intermediate member 214 is arranged in the rotational direction. The knob 201 is arranged in the rotational direction. The intermediate member 214 and the knob 201 are arranged via the bearing 215.

The intermediate member 214 is capable of moving in the Z-axis direction together with the knob 201, which is displaced in the Z-axis direction. However, the anti-rotation mechanisms restrict displacement of the intermediate member 214 in the rotational direction such that the intermediate member 214 is not capable of being displaced in the rotational direction.

A concave portion is provided on the top surface of the intermediate member 214. It is possible to insert the rotor 231 of the ultrasonic motor 203 in the concave portion. The anti-rotation grooves 292 are provided on the side surface of the concave portion. The anti-rotation grooves 292 constitute the anti-rotation mechanisms.

The Z-axis direction position detection sensor 251 is provided on the inner circumferential side surface of the ring-shaped intermediate member 214. Rotation detection sensors 241 and a position-keeping sphere 281 are provided on the outer circumferential surface of the ring-shaped intermediate member 214.

One end of the spring 212 is fixed on the bottom surface of the concave portion of the intermediate member 214. The other end of the spring 212 is fixed on the seating 207. The springs 212 are capable of expanding/contracting in the Z-axis direction.

The plurality of springs 212 are provided on the concave portion, which is provided on the top surface of the intermediate member 214 in the circumferential direction. Specifically, the plurality of springs 212 are provided on the entire area in the circumferential direction.

The springs 212 allow the stator 232 to thrust the rotor 231. Further, the springs 212 hold the stator 232 in the Z-axis direction in the state where the stator 232 thrusts the rotor 231. The springs 212 provide elastic force to the rotor 231, which is at the operation portion, via the stator 232 in the direction (upward direction of FIG. 7) away from the base 202 in the Z-axis direction of the base 220, when the knob 201 is pushed. The springs 212 are capable of causing the stator 232 to always thrust the rotor 231 irrespective of the position of the knob 201 in the Z-axis direction. In addition, it is possible to elastically hold the rotor 231 with respect to push-in operation of the knob 201. Because the springs 212 are provided, even if the knob 201 is strongly pushed in the Z-axis direction, the springs 212 are capable of elastically receiving the force. Because of this, it is possible to make pressing force, which is applied to the friction surface, smaller.

One end of the spring 211 is fixed on the bottom surface of the concave portion of the base 202. The other end of the spring 211 is fixed on the bottom surface of the inter nediate member 214. The springs 211 are capable of expanding/contracting in the Z-axis direction. The plurality of springs 211 are provided on the ring-shaped concave portion of the base 202. Specifically, the plurality of springs 211 are provided on the entire area in the circumferential direction.

When the knob 201 is pushed, the spring 211 provides elastic force to the integral member including the base 202, the ultrasonic motor 203, and the intermediate member 214 in the direction away from the base 202 in the Z-axis direction of the base 202 (upward direction of FIG. 7).

One end of the spring 213 is fixed on the base 202. The other end of the spring 213 is fixed on the intermediate member 214. The springs 213 are capable of expanding/contracting in the Z-axis direction.

When the knob 201 is pushed, the springs 213 expand. As a result, when the knob 201 is pushed, the springs 213 provide elastic force to the integral member including the base 202, the ultrasonic motor 203, and the intermediate member 214 in the upward direction of FIG. 7.

According to this embodiment, when the knob 201 is displaced in the Z-axis direction, the springs 211 provide elastic force to the integral member including the base 202, the ultrasonic motor 203, and the intermediate member 214 in one direction. When the knob 201 is displaced in the Z-axis direction, the springs 213 provide elastic force to the integral member including the base 202, the ultrasonic motor 203, and the intermediate member 214 in the same direction. As a result, it is possible to limit the push-in amount of the knob 201.

According to this embodiment, the intermediate member 214 is provided. Because of this, it is possible to make contact pressure between the rotor 231 and the stator 232 of the ultrasonic motor 203 approximately constant irrespective of the position of the knob 201 in the Z-axis direction and the position of the ultrasonic motor 203 in the Z-axis direction.

That is, when the knob 201 is pushed in the Z-axis direction, the integral member including the knob 201, the ultrasonic motor 203, and the intermediate member 214 moves in the Z-axis direction. As a result, the compression status of the spring 212 is approximately constant irrespective of the position of the ultrasonic motor 203 in the Z-axis direction. Meanwhile, according to the first embodiment, the springs 11 has the function similar to the function of the springs 212. Compression status of the springs 11 is different depending on the position of the ultrasonic motor 3 in the Z-axis direction. As a result, the contact pressure of the friction surface between the rotor 31 and the stator 32 may be different depending on the position of the ultrasonic motor 3 in the Z-axis direction.

Torque generated by the ultrasonic motor may be affected by the contact pressure of the friction surface between the rotor and the stator. Because of this, according to the first embodiment, torque may change depending on the position of the knob 1 in the Z-axis direction. To the contrary, according to this embodiment, such change of torque may not occur.

Similar to the first embodiment, the rotation detection sensors 241 are configured to detect rotation of the knob 201 (knob 1 of first embodiment). The rotation detection sensors 241 of this embodiment are fixed on the intermediate member 214. The plurality of rotation detection slits 242 are provided on the inner side surface of the knob 201. Specifically, the plurality of rotation detection slits 242 are provided on the entire area in the circumferential direction of the knob 201. The rotation detection slit 242 has the longitudinal direction in the Z-axis direction.

Similar to the first embodiment, the Z-axis direction position detection sensor 251 is configured to detect a movement amount of the knob 201 (knob 1 of first embodiment) in the Z-axis direction. In this embodiment, the magnetizing portion 252 is formed on the inner side surface of the base 202.

The position-keeping sphere 281, the first position-keeping groove 282, the second position-keeping groove 283, and the third position-keeping groove 284 constitute the position-keeping mechanism of this embodiment. The position-keeping mechanism of this embodiment is similar to the position-keeping mechanism of the first embodiment, which includes the sphere 80, the groove 82, and the groove 83. Detailed structures of the position-keeping mechanism of this embodiment will not be described. In this embodiment, the position-keeping sphere 281 is provided on the side surface of the intermediate member 214.

The anti-rotation spheres 293 and the anti-rotation grooves 292 constitute the anti-rotation mechanisms of this embodiment. The spheres 93 and the grooves 92 constitute the anti-rotation mechanisms of the first embodiment. Detailed structure of the anti-rotation mechanisms of this embodiment will not be described. In this embodiment, the grooves 292 are provided on the intermediate member 214. Similar to the first embodiment, the anti-rotation mechanisms restrict displacement of the stator 232 from the base 202 in the rotational direction.

Similar to the pressure sensor 10 of the first embodiment, the pressure sensor 210 is configured to detect pressing three when the knob 1 is displaced in the Z-axis direction.

The circular bearing 215 is arranged between the intermediate member 214 and the knob 201. An integral member including the inner frame of the hearing 215, the knob 201, and the rotor 231 rotates in response to rotation operation by an operator. Further, the bearing 215 moves together the knob 201, which is displaced in the Z-axis direction.

Third Embodiment

Next, with reference to FIG. 8 the haptic device according to a third embodiment will be described.

Figure 8:
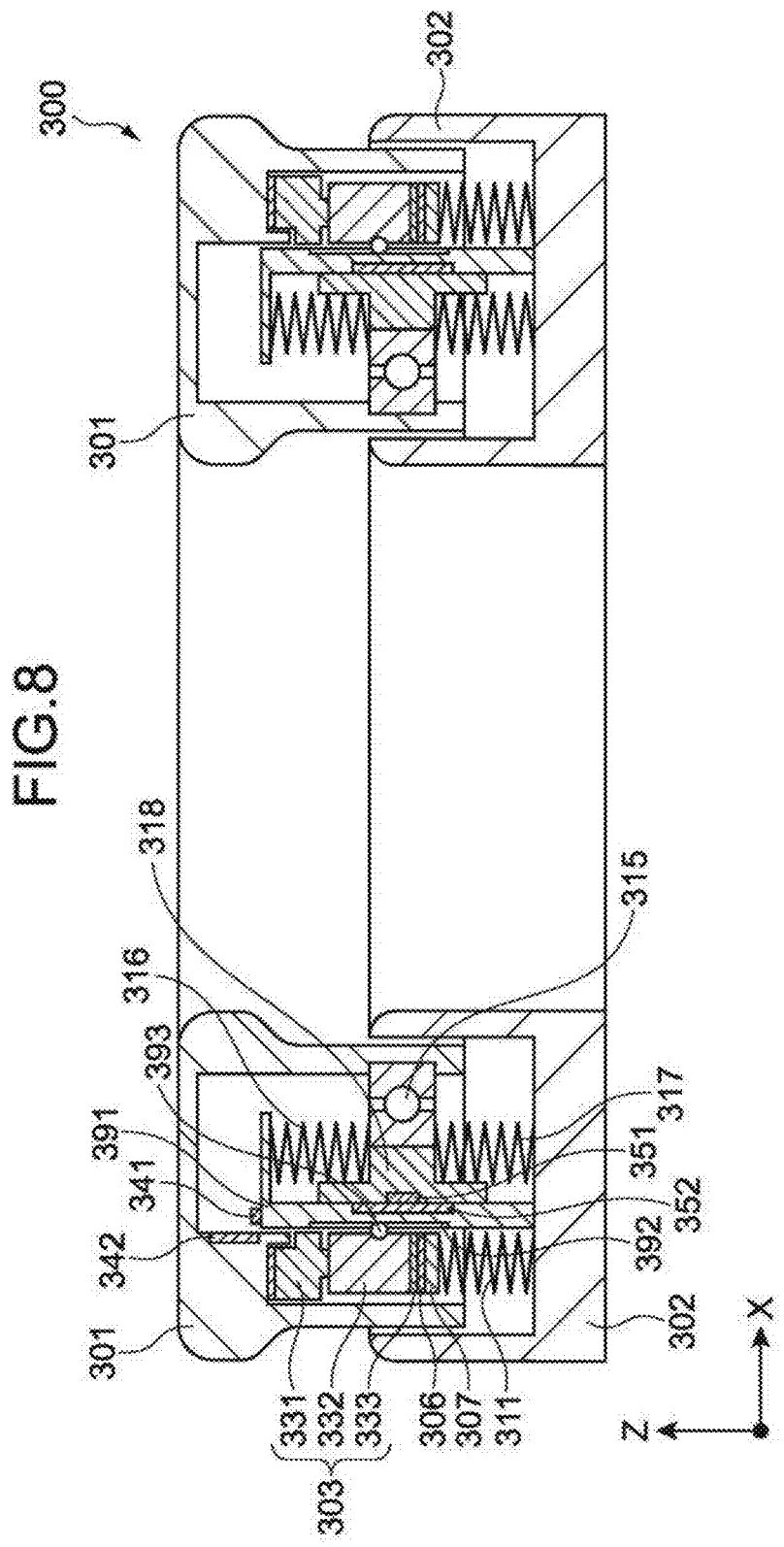
FIG. 8 is a sectional view showing an input device according to a third embodiment of the present invention.

As shown in FIG. 8, a haptic device 300 includes a knob 301 as the operation portion, a base 302, and an ultrasonic motor 303.

The haptic device 300 includes a rotation detection sensor 341 as the first detection section, and rotation detection slits 342.

The haptic device 300 includes a Z-axis direction position detection sensor 351 as the second detection section, and a magnetizing portion 352.

The haptic device 300 includes springs 311 as the first elastic members, springs 317 as the first elastic members, and springs 316 as second elastic members.

The haptic device 300 includes a cushion material 306, a seating anti-rotation grooves 392, anti-rotation spheres 393, and a bearing 315.

The haptic device 300 includes a first member 391 and a second member 318.

Note that the device of each of the first and second embodiments includes the position-keeping mechanism and the pressure sensor. However, the device of this embodiment does not include a position-keeping mechanism and a pressure sensor. The device of this embodiment may include a position-keeping mechanism and a pressure sensor similar to the first and second embodiments. The same will be applied to the following embodiments.

The knob 301 is a handle having an external form approximately same as the external form of the knob 1 of the first embodiment. The knob 301 is fixed on a rotor 331 of the ultrasonic motor 303. The rotation detection slits 342 are provided on the inner side surface of the concave portion of the knob 301.

The external form of the base 302 is approximately same as the external form of the base 2 of the first embodiment. The base 302 has a concave portion. The concave portion is provided on the entire area in the circumferential direction. In the concave portion, the knob 301 is capable of being displaced in the Z-axis direction and in the rotational direction where the Z axis is the rotational axis.

Similar to the ultrasonic motor 3 of the first embodiment, the ultrasonic motor 303 includes the rotor 331, a stator 322, and piezoelectric devices 333. The rotor 331 is fixed on the knob 301. The knob 301 and the rotor 331 are capable of being displaced in the Z-axis direction and in the rotational direction where the Z axis is the rotational axis.

The cushion material 306 is similar to the cushion material 6 of the first embodiment. The seating 307 is similar to the seating 7 of the first embodiment.

The first member 391 is fixed on the inner bottom surface of the base 302. The first member 391 protrudes from the inner bottom surface. The first member 391 has a ring shape. The first member 391 has a roof portion. The first member 391 is positioned at the inner side of the ring-shaped ultrasonic motor 3. The magnetizing portion 352 is provided on the inner side surface of the ring-shaped first member 391. The magnetizing portion 352 is configured to detect the position in the Z-axis direction. The rotation detection sensor 341 is fixed on the top surface of the ring-shaped first member 391. Further, the anti-rotation grooves 392 are provided on the outer side surface of the first member 391.

The second member 318 has a ring shape. The second member 318 is arranged in the circumferential direction. The knob 301 is arranged in the circumferential direction. The second member 318 and the knob 301 are arranged via the bearing 315. The second member 318 is capable of moving in the Z-axis direction together with the knob 301 and the bearing 315, which are displaced in the Z-axis direction. The second member 318 is not displaced in the rotational direction. The Z-axis direction position detection sensor 351 is fixed on the outer side surface of the ring-shaped second member 318.

One end of the spring 311 is fixed on the base 302. The other end of the spring 311 is fixed on the seating 307. The springs 311 are capable of expanding/contracting in the Z-axis direction. The springs 311 provide elastic force to the rotor 331 as the operation portion in response to the push-in operation of the knob 301. The plurality of springs 311 are provided on the ring-shaped concave portion of the base 302. Specifically, the plurality of springs 311 are provided on the entire area in the circumferential direction. The function of the springs 311 is similar to the function of the springs 11.

One end of the spring 317 is fixed on the base 302. The other end of the spring 317 is fixed on the bottom surface side of the second member 318. The springs 317 are capable of expanding/contracting in the Z-axis direction.

One end of the spring 316 is fixed on the tower surface of the roof portion of the first member 391. The other end of the spring 316 is fixed on the top surface side of the second member 318. The springs 316 are capable of expanding/contracting in the Z-axis direction.

The plurality of springs 316 are provided on the entire area in the circumfircmtial direction. The plurality of springs 317 are provided on the entire area in the circumferential direction. The springs 316 are arranged on the upper side of the second member 318. The springs 317 are arranged on the lower side of the second member 318. In this manner, the springs 316 and 317 sandwich the second member 318.

The springs 316 and 317 are configured to hold the second member 318 such that the second member 318 is capable of moving in the Z-axis direction. According to this embodiment, the springs 311, 316, and 317 are provided. Spring constant relation between the springs 311, 316, and 317 is adjusted. As a result, it is possible to arbitrarily set relation between pressing force, which is necessary for input operation, and pressure applied to the friction portion. Further, the springs 311, 316, and 317 are capable of limiting displacement of the knob 301 in the Z-axis direction within a predetermined range.

Similar to the first embodiment, the rotation detection sensor 341 is configured to detect rotation of the knob 301 (knob 1 of first embodiment). The rotation detection sensor 341 of this embodiment is fixed on the first member 391. The plurality of rotation detection slits 342 are provided on the inner side surface of the concave portion of the knob 301. Specifically, the plurality of rotation detection slits 342 are provided on the entire area in the circumferential direction of the knob 301. The rotation detection slit 342 has the longitudinal direction in the Z-axis direction.

Similar to the first embodiment, the Z-axis direction position detection sensor 351 is configured to detect a displacement amount of the knob 301 (knob 1 of first embodiment) in the Z-axis direction. In this embodiment, the magnetizing portion 252 is formed on the inner side surface of the first member. The Z-axis direction position detection sensor 351 is provided on the second member 318.

The anti-rotation spheres 393 and the anti-rotation grooves 392 constitute the anti rotation mechanisms of this embodiment. Similar to the spheres 93 and the grooves 92 of the first embodiment, the anti-rotation spheres 393 and the anti-rotation grooves 392 restrict displacement of the stator 322 from the base 302 in the rotational direction. In this embodiment, the anti-rotation grooves 392 are provided on the first member 391.

The circular bearing 315 is arranged in the concave portion of the knob 301. The bearing 315 is arranged between the second member 318 and the inner side surface of the knob 301. The inner frame of the bearing 315, the knob 301, and the rotor 331 rotate together in response to rotation operation by an operator. Further, the bearing 315 moves together with the knob 301, which is displaced in the Z-axis direction.

Fourth Embodiment

Next, with reference to FIG. 9, a haptic device according to a fourth embodiment will be described.

Figure 9:
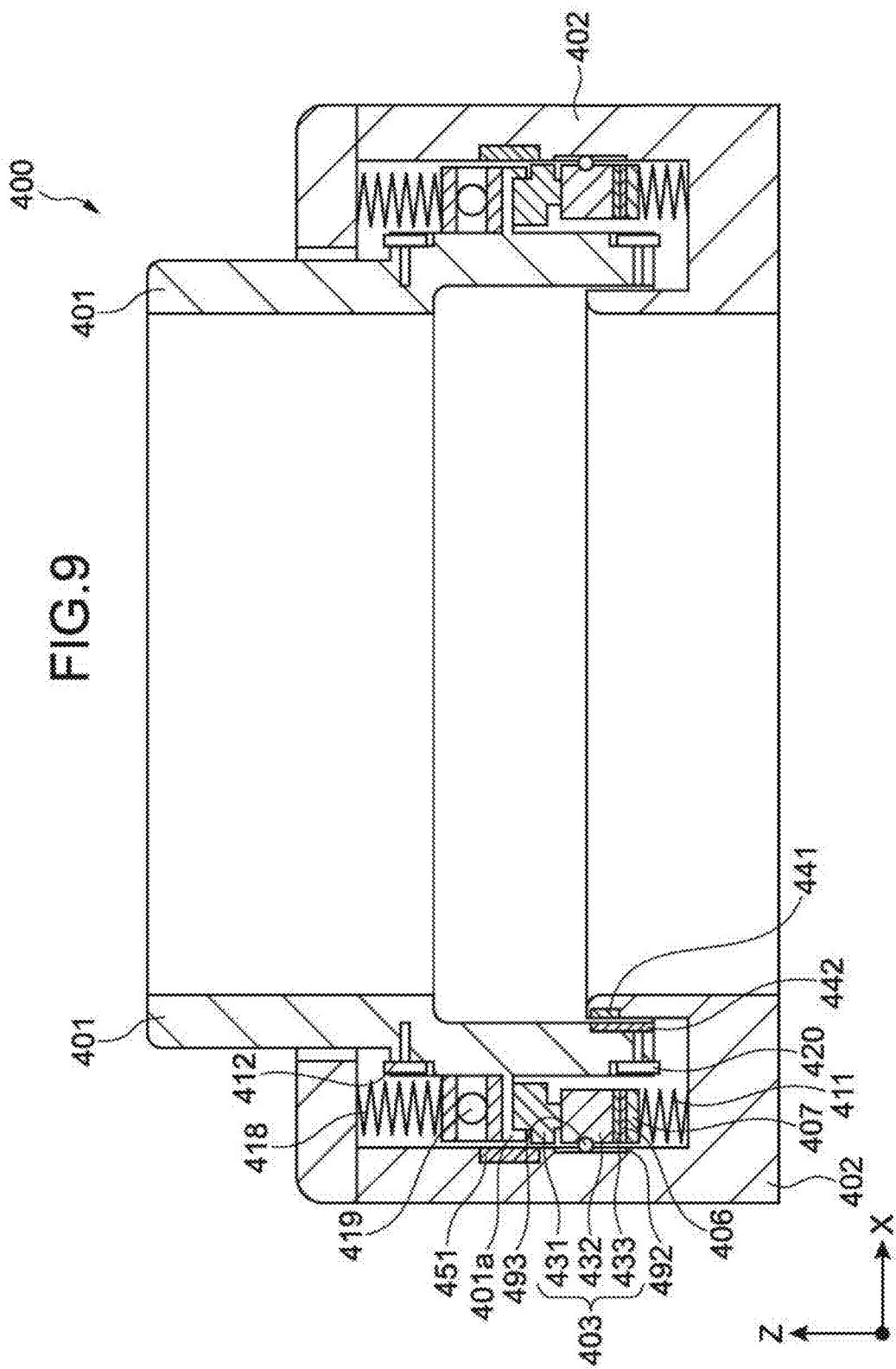
FIG. 9 is a sectional view showing an input device according to a fourth embodiment of the present invention.

As shown in FIG. 9, a haptic device 400 includes a knob 401 as the operation portion, a base 402, and an ultrasonic motor 403.

The haptic device 400 includes a rotation detection sensor 441 as first the detection section, and rotation detection slits 442.

The haptic device 400 includes Z-axis direction position detection sensors 451 as second the detection section.

The haptic device 400 includes springs 411 as the first elastic members, and springs 418 as the second elastic members.

The haptic device 400 includes a cushion material 406, a seating 407, anti-rotation grooves 492, anti-rotation spheres 493, a bearing 419, first rollers 412, and second rollers 420.

The cross section of the haptic device 400 has an upside-down T shape. Specifically, the knob 401 as the operation portion protrudes from the base 402.

The knob 401 is a handle, which is gripped by an operator when he operates the haptic device 400. The knob 401 has a ring shape. A ring-shaped protrusion portion 401a is provided on the outer circumferential surface. The protrusion portion 401a protrudes from the outer circumferential surface. The roller shafts of the first rollers 412 are fixed on the outer circumferential surface of the knob 401. The roller shafts of the second rollers 420 are fixed on the outer circumferential surface of the knob 401. Further, the rotation detection slits 442 are provided on the inner circumferential side surface of the knob 401.

The external form of the base 402 is a ring shape. The bottom portion of the base 402 is fixed on the control-target apparatus side. The base 402 has a concave portion. Specifically, the concave portion is provided on the entire area in the circumferential direction. In the concave portion, the knob 401 is capable of being displaced in the Z-axis direction and in the rotational direction where the Z axis is the rotational axis. A roof portion is provided on the base 402.

Similar to the ultrasonic motor 3 of the first embodiment, the ultrasonic motor 403 includes a rotor 431, a stator 432, and piezoelectric devices 433. The rotor 431 is fixed on the lower surface of the protrusion portion 401a of the knob 401. The rotor 431 is displaced together with the knob 401, which is displaced in the Z-axis direction and in the rotational direction.

The cushion material 406 is similar to the cushion material 6 of the first embodiment. The seating 407 is similar to the seating 7 of the first embodiment.

In FIG. 9, the bearing 419 is arranged above the protrusion portion 401a of the knob 401.

The bearing 419 is arranged between the springs 418 and the protrusion portion 401a of the knob 401. The bearing 419 includes two race plates. One race plate is fixed on the protrusion portion 401a of the knob 401. The one race plate of the bearing 419, the knob 401, and the rotor 431 rotate together in response to rotation operation by an operator.

The first rollers 412 are provided in the vicinity of the center portion of the knob 401 in the Z-axis direction. The second rollers 420 are provided in the vicinity of the lower portion of the knob 401 in the Z-axis direction.

The plurality of rollers 412 are provided on the entire area in the circumferential direction. The plurality of rollers 420 are provided on the entire area in the circumferential direction.

The shafts of the rollers 412 are fixed on the outer circumferential surface of the knob 401. The shafts of the rollers 420 are fixed on the outer circumferential surface of the knob 401. The rollers 412, 420 move in the concave portion of the base 402 together with the knob 401, which moves in the Z-axis direction. The roof portion of the base 402 restricts movement of the first rollers 412, which are positioned at the upper portion of FIG. 9, in the upward direction of FIG. 9. The inner bottom portion of the base 402 restricts movement of the second rollers 420, which are positioned at the lower portion of FIG. 9, in the downward direction of FIG. 9. In this manner, the two types of rollers 412, 420 restrict displacement of the knob 401 in the Z-axis direction within a predetermined range.

The springs 411 are arranged below the protrusion portion 401a of the knob 401 of FIG. 9.

One end of the spring 411 is fixed on the base 402. The other end of the spring 411 is fixed on the seating 407. The springs 411 are capable of expanding/contracting in the Z-axis direction.

The springs 411 provide elastic force to the rotor 431 as the operation portion in response to push-in operation of the knob 401.

The plurality of springs 411 are provided on the ring-shaped concave portion of the base 402. Specifically, the plurality of springs 411 are provided on the entire area in the circumferential direction.

The function of the springs 411 are similar to the function of the springs 11.

The springs 418 are arranged above the protrusion portion 401a of the knob 401 of FIG. 9.

One end of the spring 418 is fixed on the lower surface of the roof portion of the base 402. The other end of the spring 418 is fixed on the other race plate of the bearing 419. The springs 418 are capable of expanding/contracting in the Z-axis direction.

The springs 418 provide elastic force to the rotor 431 in response to operation of the knob 401 in the pull-up direction.

The plurality of springs 418 are provided on the ring-shaped concave portion of the base 402. Specifically, the plurality of springs 418 are provided on the entire area in the circumferential direction.

In this embodiment, the springs 411 and the springs 418 are configured to hold the ultrasonic motor 403, the bearing 419, and the knob 401. Because of this, the ultrasonic motor 403, the bearing 419, and the knob 401 are capable of being displaced in the Z-axis direction.

Similar to the first embodiment, the rotation detection sensor 441 is configured to detect rotation of the knob 401 (knob 1 of first embodiment). In this embodiment, the rotation detection sensor 441 is fixed on the base 402. The plurality of rotation detection slits 442 are provided on the inner side surface of the knob 401. The plurality of rotation detection slits 442 are provided on the entire area in the circumferential direction of the knob 401. The rotation detection slit 442 has the longitudinal direction in the Z-axis direction.

Similar to the first embodiment, the Z-axis direction position detection sensors 451 are configured to detect a displacement amount of the knob 401 (knob 1 of first embodiment) in the Z-axis direction. Here, a magnetizing portion is not shown in FIG. 9.

Fifth Embodiment

Next, with reference to FIG. 10, a haptic device according to a fifth embodiment will be described. In the fourth embodiment, the bearing is arranged at the upper portion of the protrusion portion of the base. The ultrasonic motor is arranged at the lower portion of the protrusion portion. However, according to the fifth embodiment, a bearing is arranged at the lower portion of the protrusion portion of the base. An ultrasonic motor is arranged at the upper portion of the protrusion portion.

Figure 10:
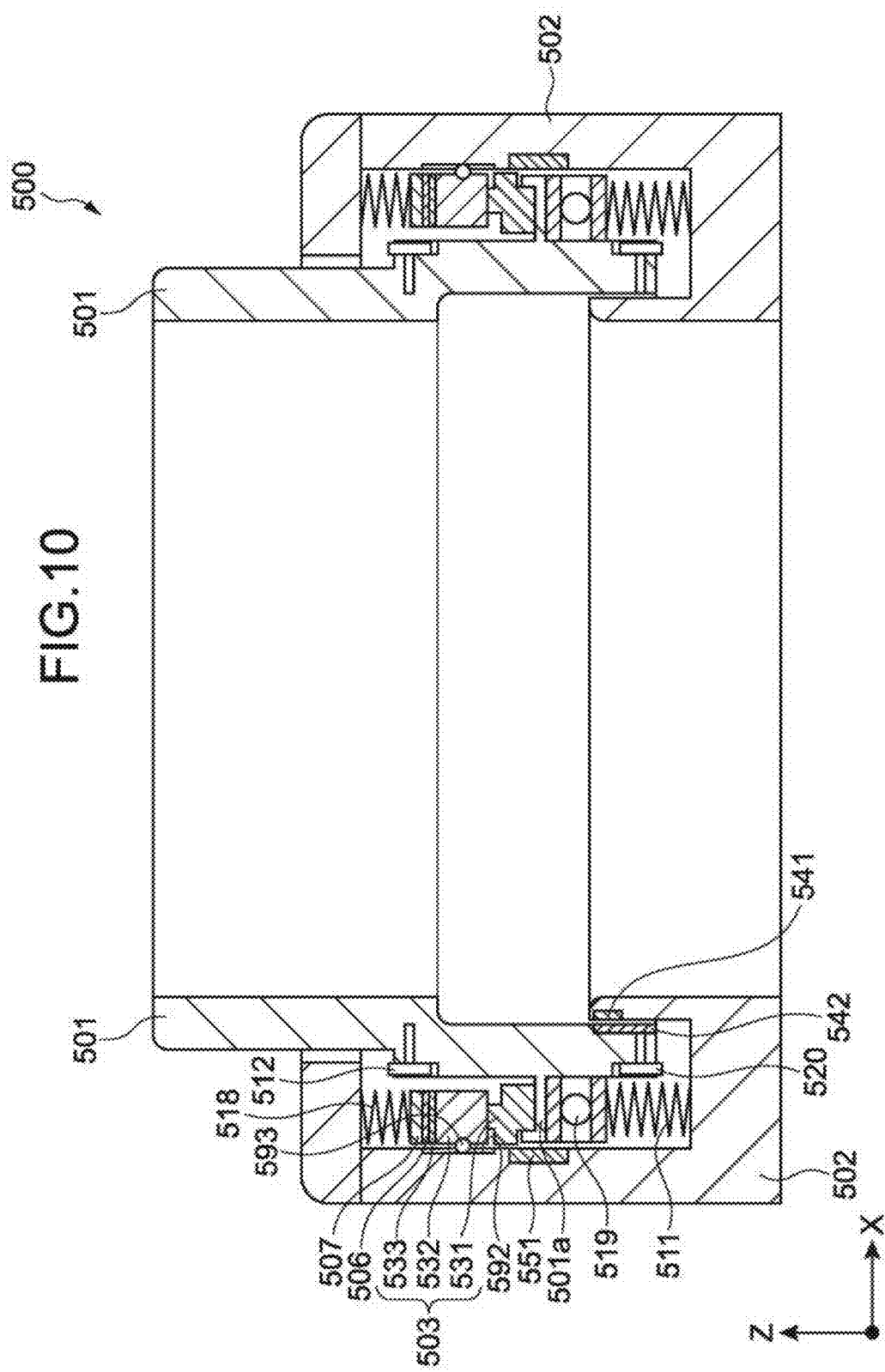
FIG. 10 is a sectional view showing an input device according to a fifth embodiment of the present invention.

As shown in FIG. 10, a haptic device 500 includes a knob 501 as the operation portion, a base 502, and an ultrasonic motor 503.

The haptic device 500 includes a rotation detection sensor 541 as the first detection section, and rotation detection slits 542.

The haptic device 500 includes Z-axis direction position detection sensors 551 as the second detection section.

The haptic device 500 includes springs 511 as the first elastic members, and springs 518 as the second elastic members.

The haptic device 500 includes a cushion material 506, a seating 507, anti-rotation grooves 592, anti-rotation spheres 593, first rollers 512, and second rollers 520.

The knob 501 is similar to the knob 401 of the fourth embodiment. The knob 501 includes a ring-shaped protrusion portion 501a. The ring-shaped protrusion portion 501.a protrudes from the outer circumferential surface. The roller shafts of the first rollers 512 are fixed on the outer circumferential surface of the knob. The roller shafts of the second rollers 520 are fixed on the outer circumferential surface of the knob. Further, the rotation detection slits 542 are provided on the knob 501.

The base 502 is similar to the base 402 of the fourth embodiment. The base 502 includes a roof portion.

The ultrasonic motor 503 is similar to the ultrasonic motor 403 of the fourth embodiment. The ultrasonic motor 503 includes a rotor 531, a stator 532, and piezoelectric devices 533. The rotor 531 is fixed on the top surface of the protrusion portion 501a of the knob 501. The rotor 531 moves together with the knob 501, which is displaced in the Z-axis direction and the rotational direction.

The cushion material 506 is similar to the cushion material 406 of the fourth embodiment. The seating 507 is similar to the seating 407 of the fourth embodiment. Further, the rollers 512, 520 are similar to the rollers 412, 420 of the fourth embodiment.

A bearing 519 is arranged bellow the protrusion portion 501a of the knob 501 of FIG. 10.

The bearing 519 is arranged between the springs 511 and the protrusion portion 501a of the knob 501. The bearing 519 includes two race plates. One race plate is fixed on the protrusion portion 501a of the knob 501. The one race plate of the bearing 519, the knob 501, and the rotor 531 rotate in response to rotation operation by an operator.

The springs 511 are arranged below the protrusion portion 501a of the knob 501 of FIG. 10.

One end of the spring 511 is fixed on the base 502. The other end of the spring 511 is fixed on the other race plate of the bearing 519. The springs 511 are capable of expanding/contracting in the Z-axis direction.

The springs 511 provides elastic force to the rotor 531 as the operation portion in response to push-in operation of the base 502.

The plurality of springs 511 are provided on the ring-shaped concave portion of the base 502. Specifically, the plurality of springs 511 are provided on the entire area in the circumferential direction.

The springs 518 are arranged above the protrusion portion 501a of the knob 501 of FIG. 10.

One end of the spring 518 is fixed on the lower surface of the roof portion of the base 502. The other end of the spring 518 is fixed on the seating 507. The springs 518 are capable of expanding/contracting in the Z-axis direction.

The springs 518 provide elastic force to the rotor 531 in response to operation of the knob 501 in the pull-up direction.

The plurality of springs 518 are provided on the ring-shaped concave portion of the base 502. Specifically, the plurality of springs 518 are provided on the entire area in the circumferential direction.

In this embodiment, the springs 511 and the springs 518 hold the ultrasonic motor 503, the bearing 519, and the knob 501 such that the ultrasonic motor 503, the bearing 519, and the knob 501 are capable of being displaced in the Z-axis direction.

The rotation detection sensor 541 and the rotation detection slits 542 constitute a rotation detection mechanism. The rotation detection sensor 541 and the rotation detection slits 542 are similar to the rotation detection sensor 441 and the rotation detection slits 442 of the fourth embodiment. Further, the Z-axis direction position detection sensors 551 are similar to the Z-axis direction position detection sensors 451 of the fourth embodiment. Further, the anti-rotation spheres 593 and the anti-rotation grooves 592 constitute the anti-rotation mechanisms of this embodiment. The anti-rotation spheres 593 and the anti-rotation grooves 592 are similar to the anti-rotation spheres 493 and the anti-rotation grooves 492, which constitute the anti-rotation mechanisms of the fourth embodiment.

Sixth Embodiment

Next, with reference to FIG. 11, a haptic device according to a sixth embodiment will be described. In the fourth embodiment, the two types of rollers are provided. To the contrary, according to the sixth embodiment, rollers are not provided. The knob is made from a resin material, which has a high sliding property. Alternatively, the surface of the sliding portion of the knob is processed to thereby obtain a high sliding property. Hereinafter, structures similar to the structures of the fourth embodiment will be denoted by similar reference symbols, and the description thereof will be omitted. Different points will mainly be described.

Figure 11:
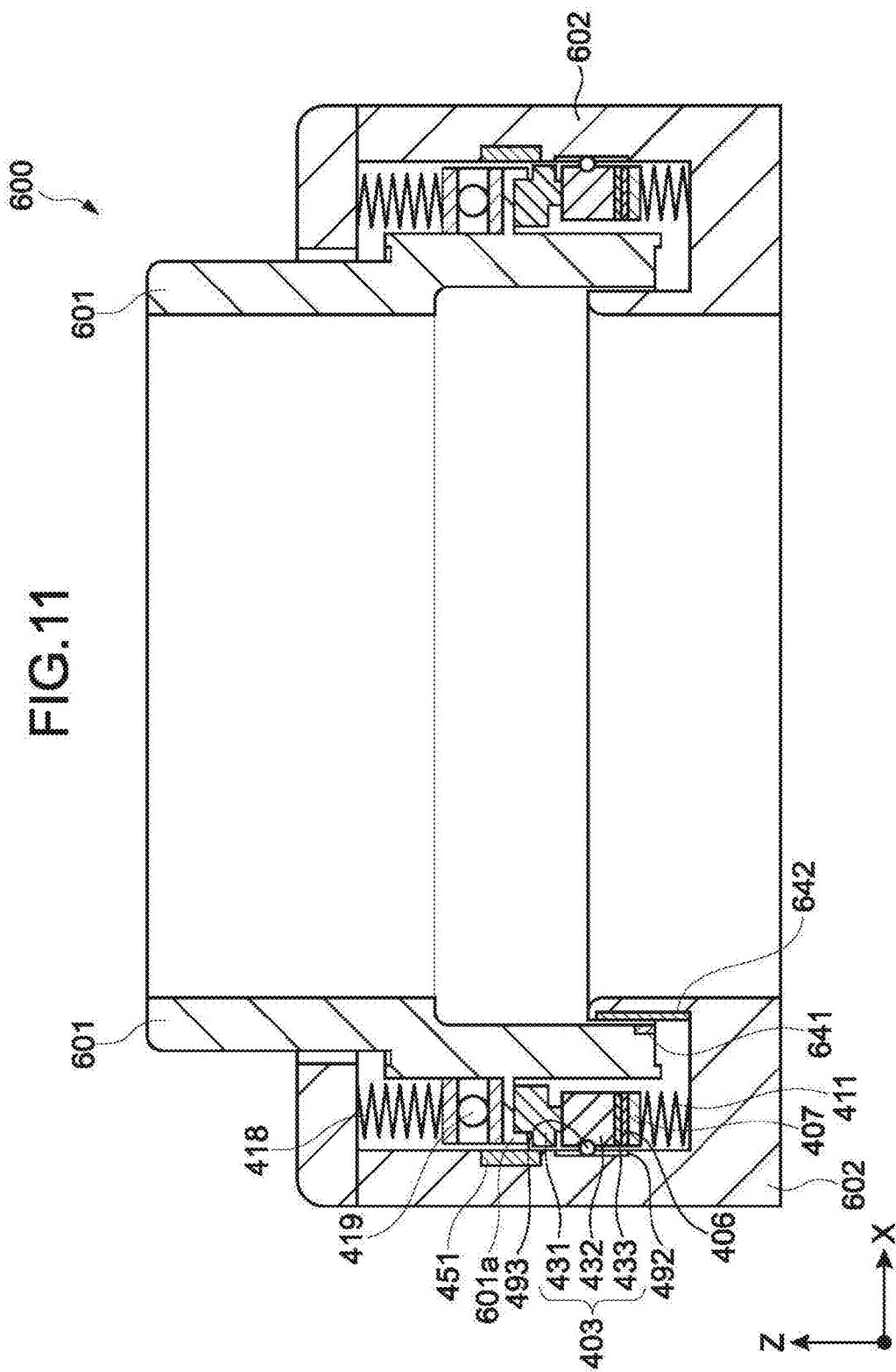
FIG. 11 is a sectional view showing an input device according to a sixth embodiment of the present invention.

As shown in FIG. 11, a haptic device 600 includes a knob 601, a base 602, and an ultrasonic motor 603.

The haptic device 600 includes rotation detection sensor 641 as the first detection section, and rotation detection slits 642.

The knob 601 has a ring shape. The knob 601 includes a ring-shaped protrusion portion 601a. The protrusion portion 601a protrudes from the outer circumferential surface of the knob 601. The knob 601 includes rotation detection sensor 641. The knob 601 is made from a resin material having a high sliding property. Because of this, the knob 601 is capable of being displaced smoothly in the rotational direction at the displacement limit in the Z-axis direction. Rollers are not provided, and the number of components is reduced.

The base 602 has a ring shape. The base 602 has a concave portion in the circumferential direction. The knob 601 is capable of being displaced in the concave portion in the Z-axis direction and in the rotational direction where the Z axis is the rotational axis. The base 602 includes the rotation detection slits 642.

Seventh Embodiment

Next, with reference to FIG. 12, a haptic device according to a seventh embodiment will be described, in the fourth embodiment, the two types of rollers are provided. To the contrary, according to the seventh embodiment, rollers are not provided. Instead, slide members 721 and 722 are provided. Hereinafter, structures similar to the structures of the above-mentioned embodiments will be denoted by similar reference symbols, and the description thereof will be omitted. Different points will mainly be described.

Figure 12:
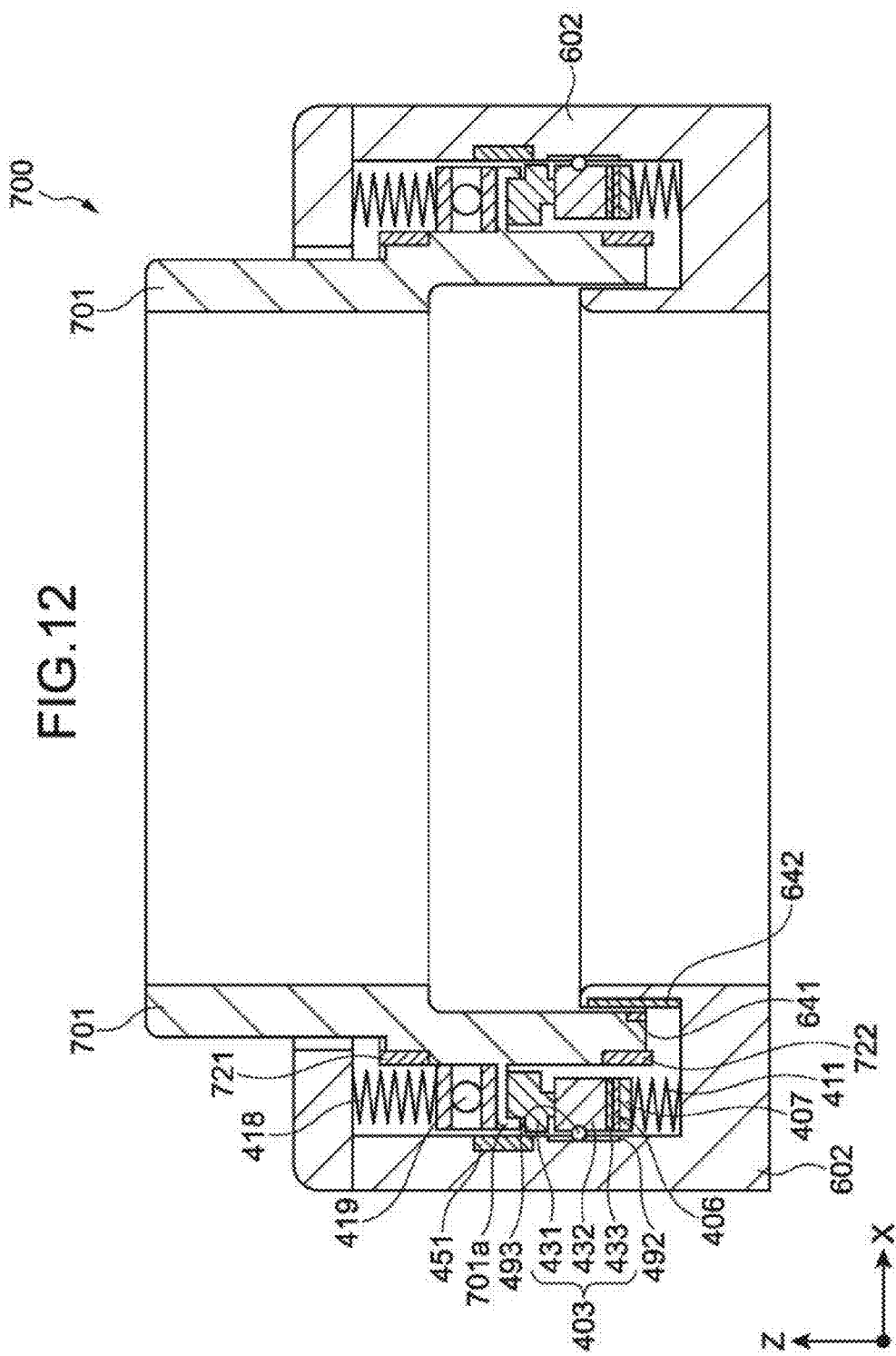
FIG. 12 is a sectional view showing an input device according to a seventh embodiment of the present invention.

As shown in FIG. 12, a haptic device 700 includes a knob 701, the base 602, and the ultrasonic motor 403.

The knob 701 includes a ring-shaped protrusion portion 701a. The protrusion portion 701a protrudes from the outer side surface. A first slide member 721 is provided in the vicinity of the center portion of the outer circumferential portion of the knob 701 in the Z-axis direction. The second slide member 722 is provided in the vicinity of the lower portion of the outer circumferential portion of the knob 701 in the Z-axis direction. The slide member 721 has a ring shape. The slide member 722 has a ring shape. The roof portion of the base 602 restricts movement of the first slide member 721 in the upward direction of FIG. 12. The inner bottom portion of the base 602 restricts movement of the second slide member 722 in the downward direction of FIG. 12. In this manner, the two slide members 721, 722 restrict displacement of the knob 701 in the Z-axis direction within a predetermined range. Further, the slide members 721, 722 allow the knob 701 to be displaced smoothly in the rotational direction at the displacement limit in the Z-axis direction.

Eighth Embodiment

Next, with reference to FIG. 13, a haptic device according to an eighth embodiment will be described. In the fourth embodiment, the one ultrasonic motor 403 is provided. To the contrary, in this embodiment, two ultrasonic motors are provided, which is greatly different from the fourth embodiment. Hereinafter, structures similar to the structures of the above-mentioned embodiments will be denoted by similar reference symbols, and the description thereof will be omitted. Different points will mainly be described.

Figure 13:
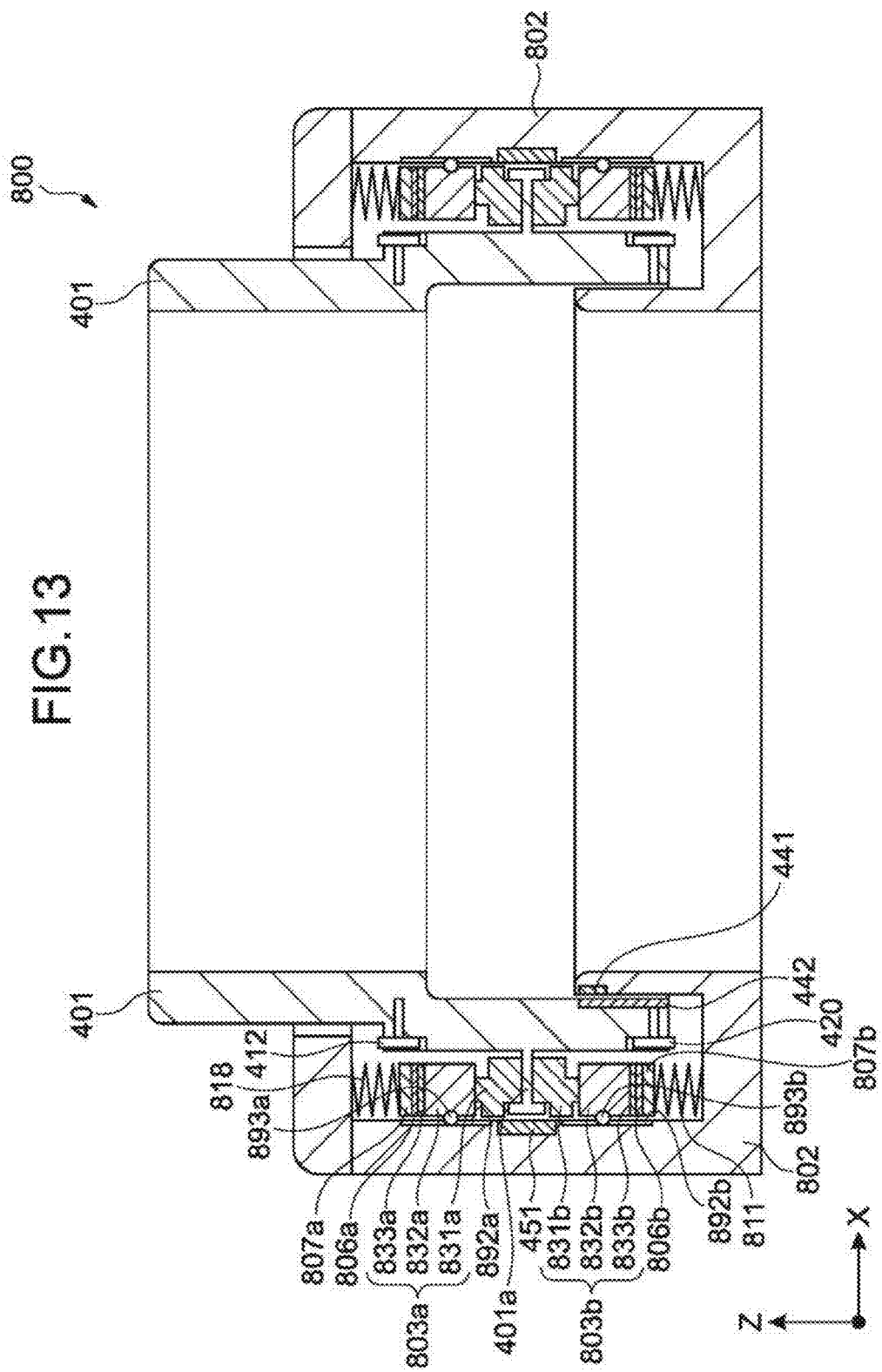
FIG. 13 is a sectional view showing an input device according to an eighth embodiment of the present invention.

As shown in FIG. 13, a haptic device 800 includes the knob 401, a base 802, a first ultrasonic motor 803a, and a second ultrasonic motor 803b.

The haptic device 800 includes springs 811 as the first elastic members, and springs 818 as the second elastic members.

The haptic device 800 includes a first cushion material 806a, a second cushion material 806b, a first seating 807a, a second seating 807b, first anti-rotation grooves 892a, second anti-rotation grooves 892b, anti-rotation spheres 893a, and anti-rotation spheres 893b.

The base 802 has a ring shape. The base 802 has a concave portion. Specifically, the concave portion is provided on the entire area in the circumferential direction. In the concave portion, the knob 401 is capable of being displaced in the Z-axis direction and in the rotational direction where the Z axis is the rotational axis. The base 802 has a roof portion. The first anti-rotation grooves 892a and the second anti-rotation grooves 892b are provided on the inner side surface of the concave portion of the base 802. The first anti-rotation grooves 892a are provided on the entire area in the circumferential direction. The second anti-rotation grooves 892b are provided on the entire area in the circumferential direction. The Z-axis direction position detection sensors 451 are provided between the first anti-rotation grooves 892a and the second anti-rotation grooves 892b in the Z-axis direction.

Similar to the ultrasonic motor 3 of the first embodiment, the first ultrasonic motor 803a (second ultrasonic motor 803b) includes a first rotor 831a (second rotor 831b), a first stator 832a (the second stator 832b), and first piezoelectric devices 833a (second piezoelectric devices 833b).

The first ultrasonic motor 803a and the second ultrasonic motor 803b are arranged as follows. The first ultrasonic motor 803a faces the second ultrasonic motor 803b via the protrusion portion 401a of the knob 401.

The first rotor 831a of the first ultrasonic motor 803a is fixed on the top surface of the protrusion portion 401a of the knob 401. The first ultrasonic motor 803a includes the first rotor 831a, the first stator 832a, and the first piezoelectric devices 833a, which are arranged in this order from the protrusion portion 401a side to the upper portion of FIG. 13.

The second rotor 831b of the second ultrasonic motor 803b is fixed on the lower surface of the protrusion portion 401a of the knob 401. The second ultrasonic motor 803b includes the second rotor 831b, the second stator 832b, and the second piezoelectric devices 833b, which are arranged in this order from the protrusion portion 401a side to the lower portion of FIG. 13.

A cushion material 806a and a seating 807a are arranged between the first ultrasonic motor 803a and the springs 818. The springs 818 are fixed on the seating 807a. Similar to the first embodiment, the cushion material 806a is provided between the ultrasonic motor 803a and the seating 807a.

A cushion material 806b and a seating 807b are arranged between the second ultrasonic motor 803b and the springs 811. The springs 811 are fixed on the seating 807b. Similar to the first embodiment, the cushion material 806b is provided between the ultrasonic motor 803b and the seating 807b.

One end of the spring 811 is fixed on the bottom surface of the concave portion of the base 802. The other end of the spring 811 is fixed on the seating 807b. The springs 811 are capable of expanding/contracting in the Z-axis direction.

The springs 811 provide elastic force to a rotor 831b as the operation portion in response to push-in operation of a knob 801.

The plurality of springs 811 are provided on the ring-shaped concave portion of the base 802. Specifically, the plurality of springs 811 are provided on the entire area in the circumferential direction.

Because the springs 811 are provided, even if the knob 801 is strongly pushed in the Z-axis direction, the springs 811 are capable of elastically receiving the force. Because of this, strong pressure is not applied to the friction portion of the second ultrasonic motor 803b.

One end of the spring 818 is fixed on the lower surface of the roof portion of the base 802. The other end of the spring 818 is fixed on the seating 807a. The springs 818 are capable of expanding/contracting in the Z-axis direction.

The springs 818 provide elastic force to a rotor 831a when an operator pulls the knob 801.

The plurality of springs 818 are provided on the ring-shaped concave portion of the base 802. The plurality of springs 818 are provided on the entire area in the circumferential direction.

The first anti-rotation spheres 893a (second anti-rotation spheres 893b) and the first anti-rotation grooves 892a (the second anti-rotation grooves 892b) constitute the anti-rotation mechanisms of this embodiment. The first anti-rotation spheres 893a (second anti-rotation spheres 893b) and the first anti-rotation grooves 892a (the second anti-rotation grooves 892b) are similar to the anti-rotation spheres 493 and the anti-rotation grooves 492, which constitute the anti-rotation mechanisms of the fourth embodiment. The first anti-rotation spheres 893a (second anti-rotation spheres 893b) are fixed on the first stator 832a (second stator 832b).

In this embodiment, the two ultrasonic motors are provided. Compared to the case where one ultrasonic motor is provided, a wider range of torque may be controlled. In addition, directions of torque generated by the two ultrasonic motors are controlled. Further, ON/OFF timing of torque generated by the two ultrasonic motors is controlled. As a result, a wider variety of generated feedback force may be realized.

Ninth Embodiment

Next, with reference to FIG. 14, a haptic device according to a ninth embodiment will be described. This embodiment is different from the first embodiment as follows. That is, the positions of Z-axis direction position detection sensors and a magnetizing portion are different. Further, the haptic device of this embodiment includes no pressure sensor. Hereinafter, structures similar to the structures of the first embodiment will be denoted by similar reference symbols, and the description thereof will be omitted. Different points will mainly be described.

Figure 14:
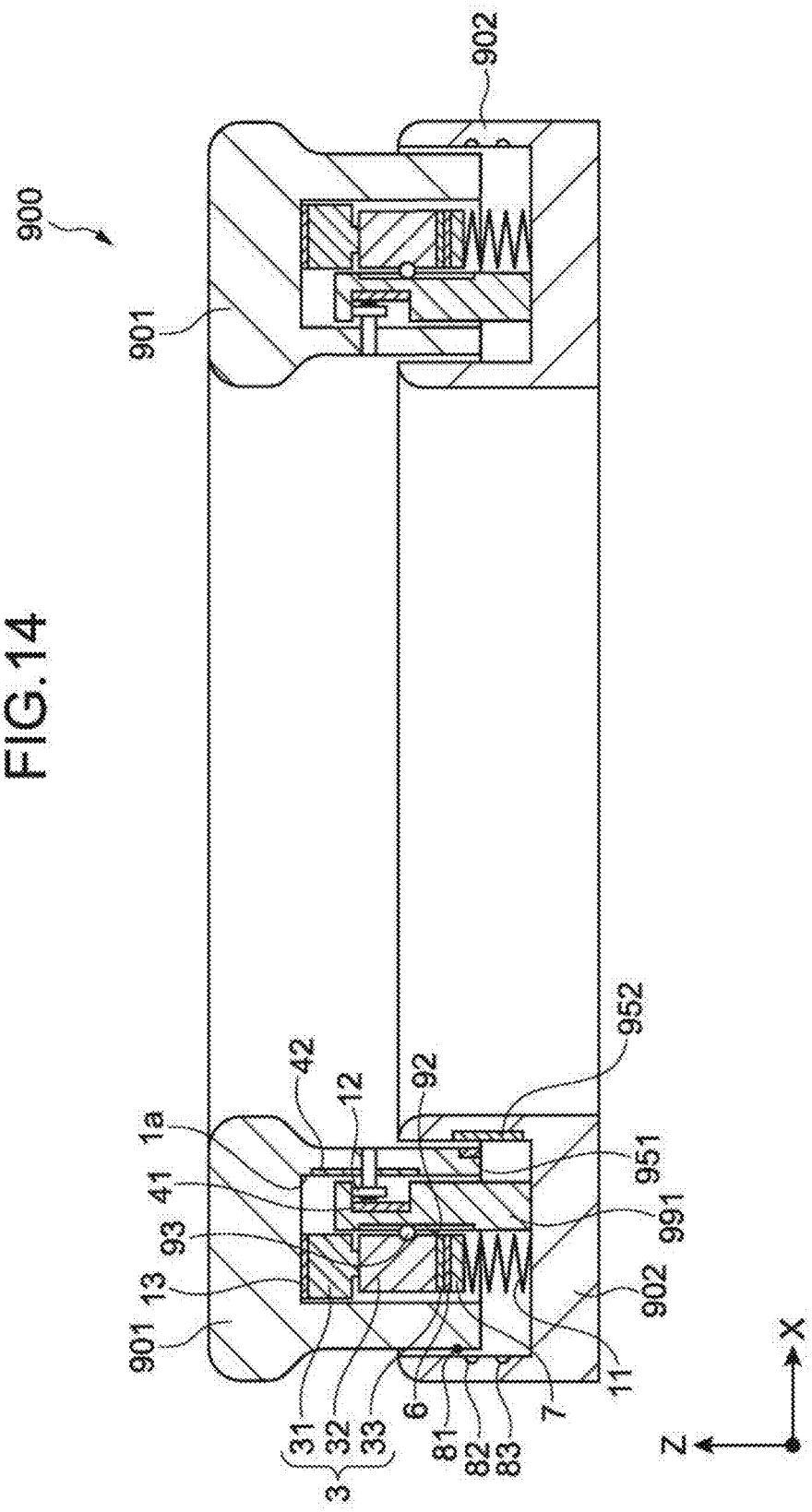
FIG. 14 is a sectional view showing an input device according to a ninth embodiment of the present invention.

As shown in FIG. 14, a haptic device 900 includes a knob 901, a base 902, and the ultrasonic motor 3.

The haptic device 900 includes a Z-axis direction position detection sensor 951 as the second detection section, and a magnetizing portion 952.

The haptic device 900 includes a first member 991.

Similar to the knob 1 of the first embodiment, the knob 901 is a ring-shaped handle. The knob 901 is fixed on the rotor 31 of the ultrasonic motor 3. The knob 901 is capable of being displaced in the Z-axis direction and in the rotational direction where the Z axis is the rotational axis. The knob 901 has a concave portion. The ultrasonic motor 3 and the like are inserted in the concave portion. The rotation detection slits 42 are provided on the inner side surface of the concave portion. The Z-axis direction position detection sensor 951 is provided at positions of the side surface of the knob 901, which face the base 902.

Similar to the base 2 of the first embodiment, the external form of the base 902 is a ring shape. The magnetizing portion 952 is provided on the side surface of the concave portion of the base 902.

The first member 991 is fixed on the inner bottom surface of the base 902. The first member 991 protrudes from the inner bottom surface. The first member 991 has a ring shape. The first member 991 is arranged in the concave portion of the knob 901. The rotation detection sensors 41 are fixed on the ring-shaped first member 991. The anti-rotation grooves 92 are formed on the ring-shaped first member 991.

Tenth Embodiment

Next, with reference to FIG. 15, a haptic device according to a tenth embodiment will be described. In the ninth embodiment, the ultrasonic motor is arranged above the springs of FIG. 14. To the contrary, according to the tenth embodiment, the ultrasonic motor is arranged below the springs. The haptic device of the tenth embodiment is a knob pull-up type device. An operator pulls up the knob to thereby input operation in the Z-axis direction in the haptic device.

The main difference between the tenth embodiment and the ninth embodiment is the positional relation between the springs and the ultrasonic motor. In addition, the haptic device of the tenth embodiment includes no Z-axis direction position detection sensor and no magnetizing portion. This is another one of differences between the tenth embodiment and the ninth embodiment. Hereinafter, structures similar to the structures of the ninth embodiment will be denoted by similar reference symbols, and the description thereof will be omitted. Different points will mainly be described.

As shown in FIG. 15, a haptic device 1000 includes a knob 1001, a base 1002, and the ultrasonic motor 3.

The haptic device 1000 includes the first member 991, a second member 1020, and springs 1011.

Similar to the knob 1 of the first embodiment, the knob 1001 is a ring-shaped handle. The knob 1001 is fixed on the rotor 31 of the ultrasonic motor 3. The knob 1001 is capable of being displaced in the Z-axis direction and in the rotational direction where the Z axis is the rotational axis. The knob 1001 has a concave portion. The ultrasonic motor 3 and the like are inserted in the concave portion. Rotation detection slits are provided on the side surface of the concave portion.

Similar to the knob 1 of the first embodiment, the external form of the base 1002 is a ring shape.

The first member 991 is fixed on the inner bottom surface of the base 1002. The first member 991 protrudes from the inner bottom surface. The first member 991 has a ring shape. The roof-shaped second member 1020 is fixed on the upper portion of the first member 991.

The upper end of the spring 1011 is fixed on the second member 1020. The lower end of the spring 1011 is fixed on the seating 7 of the ultrasonic motor 3. The roller 12, the first member 991, and the second member 1020 restrict displacement of the knob 1001 in the Z-axis direction in response to pull-up operation and push-in operation of the knob 1001 within a predetermined range. Further, the roller 12 allows the knob 1001 to be displaced smoothly in the rotational direction at the displacement limit in the Z-axis direction. The springs 1011 causes the stator 32 to always thrust the rotor 31.

In the example of each of the above-mentioned embodiments, a knob is used as the operation portion. The operation portion is not limited to a knob. The operation portion may be arbitrarily changed depending on a control-target apparatus. For example, the input device of the present invention is used as a controller for a game machine. In this case, the input device of the present invention may be mounted such that the input device operates simultaneously with a steering wheel (handle) for an automobile game. Further, the input device of the present invention may operate simultaneously with a control stick for an airplane game. The pitch angle of an airplane may be controlled by input operation in the Z-axis direction. The roll angle may be controlled by input operation in the rotational direction. Haptic feedback may be provided to input operation in the rotational direction when the pitch angle is out of a predetermined range. The input device may be arbitrarily used. Further, the input device of the present invention is preferable in a case of operating digital equipment with an analog operational feeling.

According to the example of each of the above-mentioned embodiments, the rotor side of the oscillatory wave motor (ultrasonic motor) functions as the operation portion of the input device. Alternatively, the stator side may function as the operation portion of the input device.

The present disclosure contains subject matter related to that disclosed in Japanese Priority Patent Application JP 2012-046799 filed in the Japan Patent Office on Mar. 2, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A haptic feedback input device, comprising:
a base;
an operation portion;
an oscillatory wave motor including a stator and a rotor, the rotor thrusting the stator, the oscillatory wave motor providing haptic feedback to an operator via the operation portion;
a holding unit configured to hold the oscillatory wave motor with respect to the base such that the oscillatory wave motor is kept apart from the base and such that a displacement of the oscillatory wave motor with respect to the base in an axial direction is allowed; and
an anti-rotation unit configured to restrict a displacement of one of the stator and the rotor with respect to the base in a rotational direction,
wherein the operation portion is coupled to the other one of the stator and the rotor.

2. The haptic feedback input device according to claim 1, wherein the anti-rotation unit is configured to restrict a displacement of the stator with respect to the rotor in a rotational direction, and
the operation portion is coupled to the rotor.

3. The haptic feedback input device according to claim 2, further comprising a position-keeping mechanism configured to hold the oscillatory wave motor in a plurality of positions with respect to the base in the axial direction.

4. The haptic feedback input device according to claim 2, further comprising:
a first detection section configured to detect a displacement of the operation portion with respect to the base in a rotational direction.

5. The haptic feedback input device according to claim 2, further comprising a second detection section configured to detect a displacement of the operation portion with respect to the base in an axial direction.

6. The haptic feedback input device according to claim 2, further comprising:
a first detection section configured to detect a displacement of the operation portion with respect to the base in a rotational direction; and
a second detection section configured to detect a displacement of the operation portion with respect to the base in an axial direction.

7. The haptic feedback input device according to claim 6, further comprising a position-keeping mechanism configured to hold the oscillatory wave motor in a plurality of positions with respect to the base in the axial direction,
wherein the second detection section is configured to detect the positions of the oscillatory wave motor, the positions being held by the position-keeping mechanism, to thereby detect the displacement of the operation portion with respect to the base in the axial direction; and
wherein the first detection section is configured to detect the displacement of the operation portion with respect to the base in the rotational direction when the position-keeping mechanism holds the oscillatory wave motor in any one of the positions.

8. The haptic feedback input device according to claim 2, wherein the holding unit includes a first elastic member configured to provide an elastic force to the operation portion in an axial direction of the base departing the base.

9. The haptic feedback input device according to claim 2, wherein the holding unit includes a second elastic member configured to provide an elastic force to the operation portion in an axial direction of the base toward the base.

10. The haptic feedback input device according to claim 6, wherein the holding unit includes a first elastic member configured to provide an elastic force to the operation portion in an axial direction of the base departing from the base.

11. The haptic feedback input device according to claim 6, wherein the holding unit includes a second elastic member configured to provide an elastic force to the operation portion in an axial direction of the base toward the base.

12. The haptic feedback input device according to claim 7, wherein the holding unit includes a first elastic member configured to provide an elastic force to the operation portion in an axial direction of the base departing from the base.

13. The haptic feedback input device according to claim 7, wherein the holding unit includes a second elastic member configured to provide an elastic force to the operation portion in an axial direction of the base toward the base.

14. The haptic feedback input device according to claim 8, wherein the holding unit further includes a second elastic member configured to provide an elastic force to the operation portion in an axial direction of the base toward the base.

15. The haptic feedback input device according to claim 10, wherein the holding unit further includes a second elastic member configured to provide an elastic force to the operation portion in an axial direction of the base toward the base.

16. The haptic feedback input device according to claim 12, wherein the holding unit further includes a second elastic member configured to provide an elastic force to the operation portion in an axial direction of the base toward the base.

* * * * *